US011727314B2

(12) United States Patent
Bansal et al.

(10) Patent No.: US 11,727,314 B2
(45) Date of Patent: Aug. 15, 2023

(54) AUTOMATED MACHINE LEARNING PIPELINE EXPLORATION AND DEPLOYMENT

(71) Applicant: Amazon Technologies, Inc., Seattle, WA (US)

(72) Inventors: Tanya Bansal, Seattle, WA (US); Piali Das, Rutherford, NJ (US); Leo Parker Dirac, Seattle, WA (US); Fan Li, Bothell, WA (US); Zohar Karnin, Hoboken, NJ (US); Philip Gautier, New York, NY (US); Patricia Grao Gil, Seattle, WA (US); Laurence Louis Eric Rouesnel, New York, NY (US); Ravikumar Anantakrishnan Venkateswar, Sammamish, WA (US); Orchid Majumder, Bellevue, WA (US); Stefano Stefani, Issaquah, WA (US); Vladimir Zhukov, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 887 days.

(21) Appl. No.: 16/587,301

(22) Filed: Sep. 30, 2019

(65) Prior Publication Data

US 2021/0097444 A1 Apr. 1, 2021

(51) Int. Cl.
G06N 20/20 (2019.01)
G06F 9/50 (2006.01)
G06F 9/54 (2006.01)

(52) U.S. Cl.
CPC .......... *G06N 20/20* (2019.01); *G06F 9/5066* (2013.01); *G06F 9/546* (2013.01)

(58) Field of Classification Search
CPC ....... G06F 9/546; G06F 9/5066; G06N 20/20; G06N 5/003; G06N 3/0454
See application file for complete search history.

(56) References Cited

U.S. PATENT DOCUMENTS 10,496,653 B1* 12/2019 Epshteyn .......... G06F 16/24578
10,572,773 B2* 2/2020 Yehezkel Rohekar .. G06N 3/04
2015/0073929 A1* 3/2015 Psota ................ G06Q 30/0605
705/26.2

(Continued)

OTHER PUBLICATIONS

International Search Report and Written Opinion, PCT App. No. PCT/US2020/053197, dated Feb. 12, 2021, 12 pages.

(Continued)

*Primary Examiner* — Abdullahi E Salad
(74) *Attorney, Agent, or Firm* — Nicholson De Vos Webster & Elliott, LLP

(57) ABSTRACT

Techniques for automated machine learning (ML) pipeline exploration and deployment are described. An automated ML pipeline generation system allows users to easily construct optimized ML pipelines by providing a dataset, identifying a target column in the dataset, and providing an exploration budget. Multiple candidate ML pipelines can be identified and evaluated through an exploration process, and a best ML pipeline can be provided to the requesting user or deployed for production inference. Users can configure, monitor, and adapt the exploration at multiple points in time throughout.

23 Claims, 13 Drawing Sheets

(56) References Cited

U.S. PATENT DOCUMENTS

| | | | |
|---|---|---|---|
| 2016/0132787 A1* | 5/2016 | Drevo .................... | G06N 20/10 |
| | | | 706/12 |
| 2017/0213154 A1* | 7/2017 | Hammond ............... | G06N 5/04 |
| 2019/0361697 A1* | 11/2019 | Hu .......................... | G06F 8/433 |
| 2020/0082270 A1* | 3/2020 | Gu ........................ | G06N 3/0427 |
| 2020/0097847 A1* | 3/2020 | Convertino ............ | G06N 20/00 |
| 2020/0265118 A1* | 8/2020 | Rofrano ................. | G06F 40/40 |
| 2021/0065048 A1* | 3/2021 | Salonidis ................ | G06F 9/542 |
| 2022/0036246 A1* | 2/2022 | Chen ...................... | G06N 20/20 |

OTHER PUBLICATIONS

International Preliminary Report on Patentability, PCT App. No. PCT/US2020/053197, dated Apr. 14, 2022, 9 pages.
Office Action, EP App. No. 20792816.9, dated Oct. 5, 2022, 8 pages.
Office Action, EP App. No. 20792816.9, dated Feb. 13, 2023, 11 pages.

* cited by examiner

ML PIPELINE EXPLORATION
*INTERACTIVE CODE EXPLORATION NOTEBOOK*

PREPARE DATASET:

```
BASE_JOB_NAME = 'MY-PREDICTION-11FEB'
DATASET_URL = 'STORAGE://DATAALL-LOC1-OOM/FILTERED/'
STORAGE_LOC= 'STORAGE://WESTREGION-LOC1-OOM/INTERMEDIATE/'
IMPORT MLSERVICE
IMPORT MLSERVICE.AUTOML AS AUTOML
FROM MLSERVICE.AUTOML IMPORT UNIQUIFY
...
```
— 805

DEFINE FEATURE PROCESSING PIPELINES:

```
%%MLSERVICE_PIPELINE --STEP FP_BASELINE
FP0 = SCIKITLEARN(
        SOURCE_DIR='FEATURE_PROCESSORS'
        TRAIN_INSTANCE_TYPE='X1.Y2.2XL'
        TRAIN_INSTANCE_COUNT=1
        ...
)
FP0.FIT(DATASET_URL, JOB_NAME=BASE_JOB_NAME+'-FP0-BASELINE'+UNIQUIFY(), WAIT=TRUE)
%%MLSERVICE_PIPELINE --STEP FP_BASELINE
BT0 = FP0.TRANSFORMER(
        INSTANCE_TYPE='ML.M5.XLARGE',
        ...
)
BT0.TRANSFORM(DATASET_URL, JOB_NAME=BASE_JOB_NAME+'-BT0-BASELINE'+UNIQUIFY(), WAIT=TRUE)
...
```
— 810

RUN PIPELINES IN PARALLEL:

<u>RUNNING PIPELINE FP_BASELINE</u>
<u>RUNNING PIPELINE FP_QUADRATIC</u>  — 815
<u>RUNNING PIPELINE FP_BUCKETIZE</u>
<u>RUNNING PIPELINE FP_LOGBUCKETIZE</u>

MODEL TRAINING AND TUNING:

```
ALGO_LIST = [
    {
        'NAME'='LINEAR1',
        'ALGORITHM'='LINEARLEARNER',
        'HYPERPARAMETER_RANGES': [],
        'INPUT_URL': STORAGE_LOC + '/FP0-BASELINE/',
    }, {
        'NAME'='LINEAR2',
        'ALGORITHM'='LINEARLEARNER',
        'HYPERPARAMETER_RANGES': [],
        'INPUT_URL': STORAGE_LOC + '/FP0-QUADRATIC/',
    }, {
        'NAME'='XG_BOOST_1',
        'ALGORITHM'='XGBOOST',
        'HYPERPARAMETER_RANGES': [],
        'INPUT_URL': STORAGE_LOC + '/FP0-BASELINE/',
```
— 820

*FIG. 8*

AUTOMATED MACHINE LEARNING PIPELINE EXPLORATION AND DEPLOYMENT

BACKGROUND

The field of machine learning has become widely accepted as a significant driver of the future of technology. Organizations everywhere now seek to use machine learning techniques to address a wide variety of problems, such as optimizing aspects of their products, internal processes, customer experience, etc. While the high-level view of machine learning sounds simple—e.g., provide training data to a computer, to allow the computer to automatically learn from the training data to generate a model that can make predictions for other data—implementing machine learning in practice can be tremendously difficult.

For example, many organizations are racing to implement ML solutions for their business problems, such as classification models for fraud detection and churn prediction, or regression models for risk assessment. However, building these solutions generally requires hiring experts in machine learning, who are in short supply and hard to retain. Due to a lack of deep training in math and statistics, most software engineers have a hard time developing good judgement on why one ML algorithm will work better than another, not to mention finding appropriate algorithm parameters. Beyond that, often times users need to clean up the data or preprocess it in order to build good models, and most users don't have the knowledge or ability to do that. Instead, typically users will use a dataset as it is, try one or two algorithms that are easy to use, and settle for whatever quality level they achieve—or give up entirely. As a result, organizations struggle with getting the desired model quality. Additionally, even for data scientists who have comprehensive ML knowledge, these scientists may need to spend huge amounts of their time experimenting with different ML solutions in order to find a best one for a particular problem.

These and other difficulties are partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which:

FIG. 8 is a diagram illustrating one exemplary interactive code exploration user interface for viewing and/or modifying an automated machine learning pipeline exploration according to some embodiments.

DETAILED DESCRIPTION

The present disclosure relates to methods, apparatus, systems, and non-transitory computer-readable storage media for automated machine learning pipeline exploration and deployment. According to some embodiments, an automated machine learning (ML) pipeline generation system (or "AMPGS") allows users to easily construct optimized ML pipelines by simply providing a dataset, identifying a target column in the dataset, and providing an exploration budget. A ML pipeline is a series of processing steps that collectively operate on input data to generate an ML inference result, which may include feature and target preprocessing operations (or, a "feature preprocessing pipeline" of the overall ML pipeline, which may include use of one or more ML models) followed by an inference ML model, for example. The AMPGS system can generate a single trained ML pipeline that can be deployed to execute real time or batch inference, and in some embodiments allows users to have visibility into the details of the resulting ML model, the details of the training job leading to the ML model, the parameters and operations of the ML pipeline, and optionally some or all of these details of other ML pipelines that were explored yet ultimately determined to be less-performant. In some embodiments the AMPGS system also produces feature processing code and interactive code exploration "notebooks" that educate users regarding the components of the ML pipeline(s), providing explanation of the steps taken by the system. In some embodiments, the AMPGS thus provides a "white box" approach by showing users the incremental steps or jobs that were executed to arrive at an ultimate ML model produced for inference purposes, which may also enable users to modify and repeat the process to iteratively fine tune ML pipelines to their specific needs.

In some embodiments, users are thus enabled to quickly build ML models—e.g., classification and regression models—without any substantial ML knowledge. For example, users in some embodiments may provide a tabular dataset and identify a target column in the dataset to predict, and the AMPGS system then automatically explores ML pipeline solutions with different combinations of data preprocessors, algorithms, and/or algorithm parameter settings to find a "best" model. In some embodiments, users may then directly deploy this best model (in terms of a ML pipeline) to a production environment (e.g., with just one click) or iterate on the recommended solution(s) to further improve the model quality.

Figure 1:
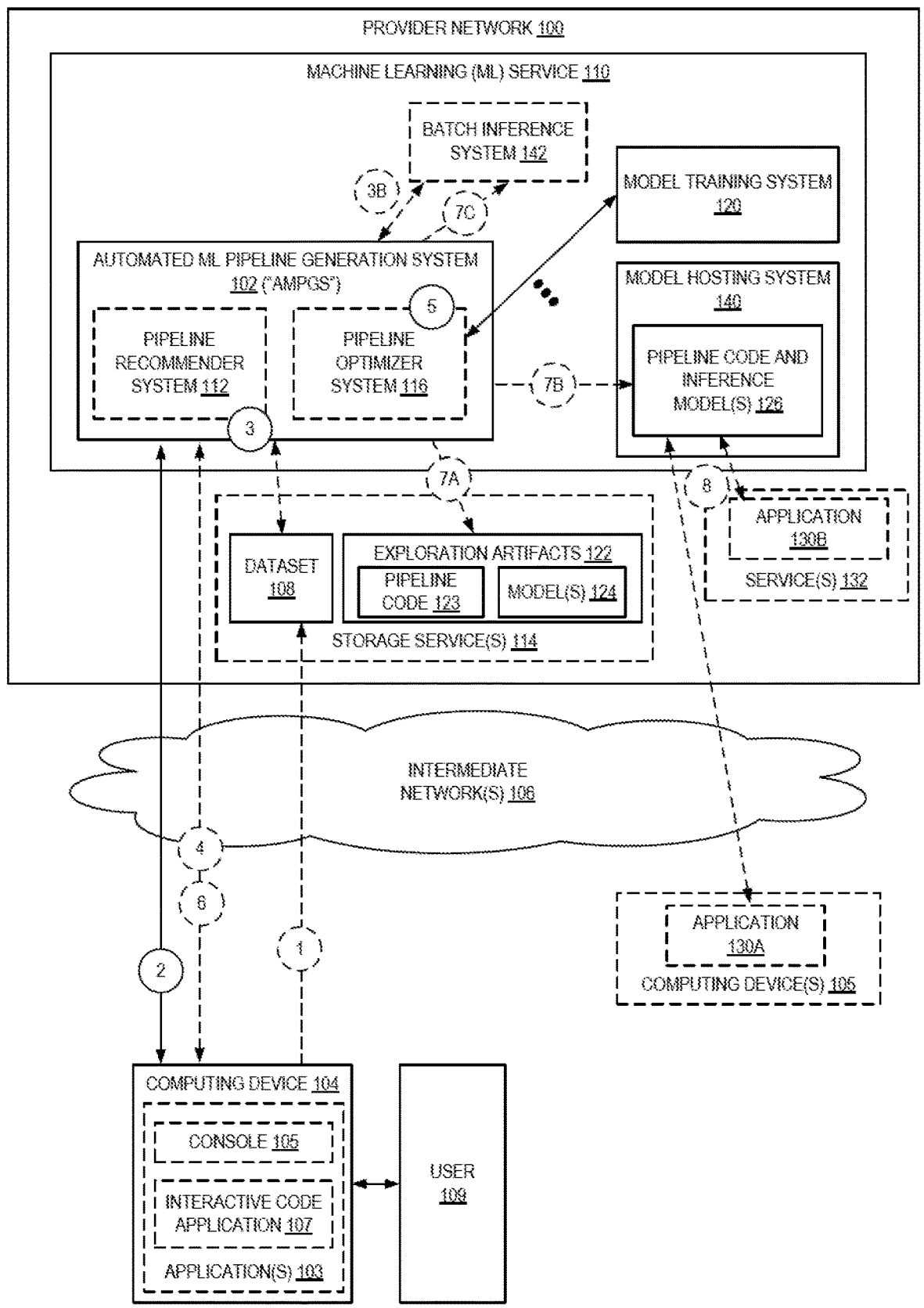
FIG. 1 is a diagram illustrating an environment for automated machine learning pipeline exploration and deployment according to some embodiments.

FIG. 1 is a diagram illustrating an environment for automated machine learning pipeline exploration and deployment according to some embodiments. In FIG. 1, an automated machine learning pipeline generation system 102 (or "AMPGS") implemented as part of a machine learning service 110 develops, evaluates, and/or deploys ML pipelines on behalf of users 109. The AMPGS 102 (and ML service 110) may be implemented as software, hardware, or a combination of both using one or more computing devices in one or multiple networks and/or geographic locations. In some embodiments, the AMPGS 102 is implemented within a multi-tenant provider network 100 and operates as part of a ML service 110 to offer ML-related operations described herein as a service to users 109.

A provider network 100 (or, "cloud" provider network) provides users 109 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service 114 that can store data objects, etc. The users 109 (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") may refer to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 106 (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As described herein, in some embodiments the AMPGS 102 makes the ML model building process easier and faster. Instead of requiring users 109 to decide which ML algorithm to use, the AMPGS 102 can automatically select multiple different ML algorithms from a list of high performing algorithms it natively supports and evaluate some or all of them. The AMPGS 102 can also automatically evaluate different hyperparameter settings for those algorithms in an effort to increase the resulting quality of ML model found. In some embodiments, users 109 do not need to be concerned with data cleaning or preprocessing either, as the AMPGS 102 can automatically apply different types of data preprocessors on the data before passing it through the ML algorithms to train ML models. The AMPGS 102 in some embodiments also makes details and artifacts of the ML pipelines it has evaluated, such as the corresponding source code, fully accessible to users, allowing advanced users (such as data scientists) to quickly run baselines and iterate on the results to further improve model quality.

To start the process, in some embodiments a user 109 may provide or otherwise identify a dataset 108 for using in ML pipeline exploration. For example, as shown at optional circle (1), the user 109 may utilize an application 103 executed by a computing device 104 (e.g., a web-application implementing a console 105 for the provider network 100, a spreadsheet plugin, a standalone application, another web-application of another entity that utilizes the AMPGS 102 as a part of a backend, a database or mixed-SQL environment, etc.) to cause the computing device 104 to upload the dataset 108 to a storage location (e.g., provided by a storage service 114 such as an object storage service of a provider network 100).

For example, the dataset 108 may be a columnar dataset that includes rows (or entries) of data values, where the data values may be arranged according to one or more columns (or attributes) and may be of a same datatype or different datatypes. In some cases, the dataset 108 may include headings or other metadata describing names or datatypes of the columns, though in some cases this metadata may not exist. For example, the dataset 108 may have been provided by a user as a plaintext file (e.g., a comma-separated values (CSV) or tab-separated values (TSV) file), an exported database table or structure, an application-specific file such as a spreadsheet, etc. However, in some embodiments the dataset 108 may also be a database table (e.g., hosted by a database service of the provider network 100 or another system), data from a web page or webservice, etc.

The user 109 may, at circle (2), utilize the computing device 104 to initiate ML pipeline exploration by the AMPGS 102. For example, the user 109 may cause the computing device 104 to issue one or more requests (e.g., API calls) to the ML service 110, which may occur through the user 109 configuring an ML exploration job using one or more user interfaces such as those depicted in FIGS. 2-4. Such user interfaces may be provided by the ML service 110 (or by another service of the provider network), and the user 109 may provide user input via these interfaces which is ultimately provided to the AMPGS 102 to configure, launch, and/or modify an ML exploration job.

Figure 2:
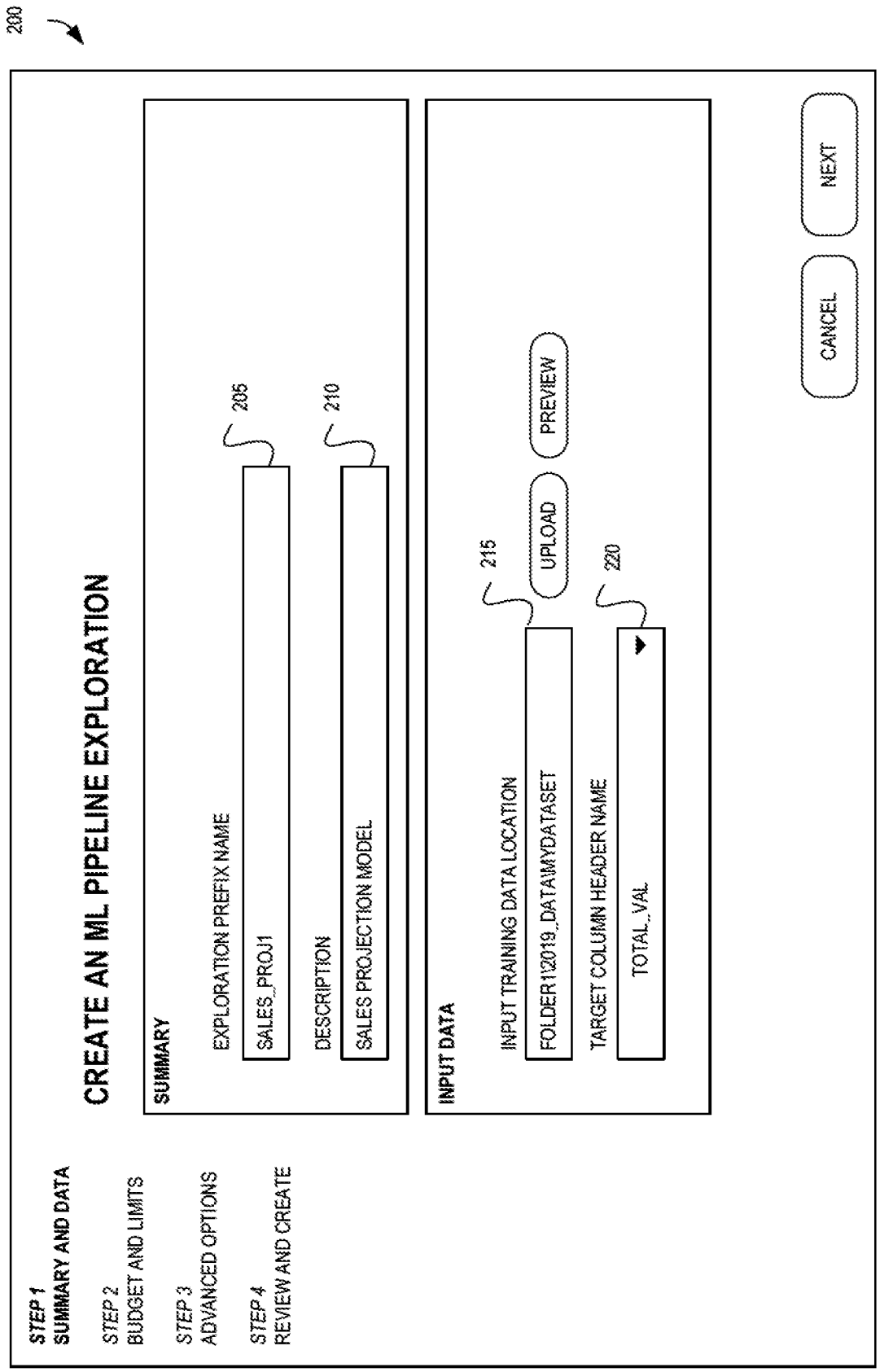
FIG. 2 is a diagram illustrating one exemplary user interface for creating an automated machine learning pipeline exploration according to some embodiments.

For example, FIG. 2 is a diagram illustrating one exemplary user interface 200 for creating an automated machine learning pipeline exploration according to some embodiments. This and other user interfaces are shown as including various exemplary data fields and user interface input elements (e.g., text input boxes, drop down boxes, etc.); it is to be understood that these are exemplary and representative of just one embodiment—many other data fields and elements can be implemented in various embodiments by those of skill in the art.

As illustrated, user interface 200 allows the user 109 to provide a name 205 and a description 210 for an exploration. The user interface 200 also allows provides a user interface element 215 the user to identify a dataset to be used for model training purposes, such as by selecting a file or storage location (e.g., from a set of storage objects associated with the user's account within a storage service), providing a resource identifier (e.g., a Uniform Resource Locator (URL)), directly uploading a dataset, etc.

The user interface 200 also includes a user interface element 220 where the user can identify a column from the dataset including values that should be inferred by the model (that is, that the model should ultimately output as its prediction given input data). The user interface element 220 may provide a list of columns to choose (e.g., after the AMPGS 102 has obtained the dataset identified via element 215 and identified the columns contained therein), allow the user to provide an identifier (e.g., a column name or number) of the column, etc.

Figure 3:
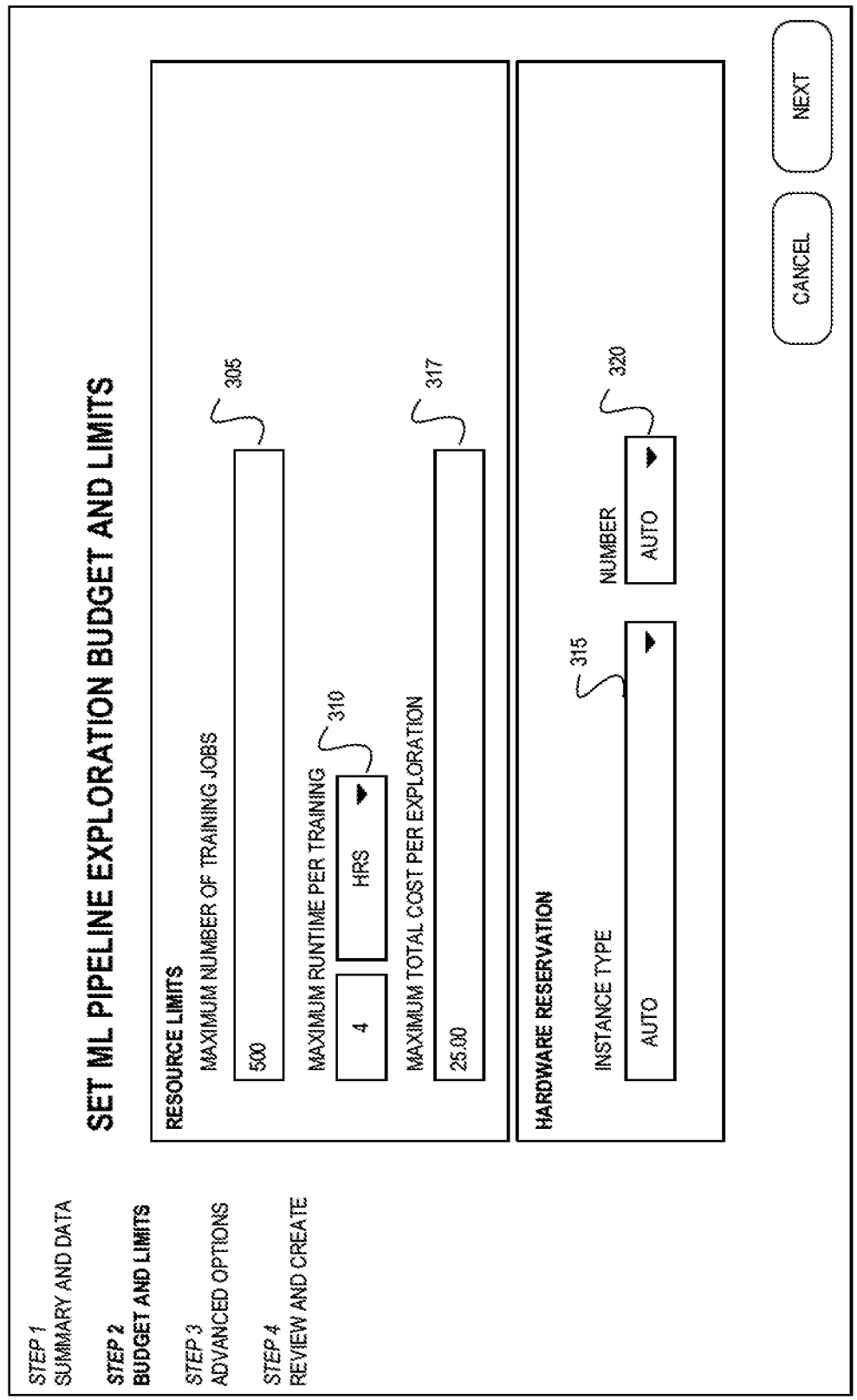
FIG. 3 is a diagram illustrating one exemplary user interface for configuring exploration budgets and preferred processing resources for automated machine learning pipeline exploration according to some embodiments.

The user may also configure, in some embodiments, exploration budget information and computing resource utilization settings for a ML pipeline exploration. Such configuration options provide users the ability to flexibly control the speed, thoroughness, and/or expense of an exploration based on their particular needs. FIG. 3 is a diagram illustrating one exemplary user interface 300 for configuring exploration budgets and preferred processing resources for automated machine learning pipeline exploration according to some embodiments. In this user interface 300, a user can control how the ML pipeline explorations is to be performed by the AMPGS 102, e.g., by using a user interface element 305 to set a maximum number of training jobs (e.g., a number of ML models that should be trained in whole or in part) that should be run during the exploration. The user can also indicate how long any particular training may continue via another two input elements 310, which in this example allow a user to indicate a number (here "4") and a corresponding unit of time (here, "hrs" meaning hours, though other options could be selected such as seconds, minutes, days, weeks, etc.), at which point a training job can be halted. In some embodiments, a user may also use an input element 317 to provide a maximum cost (or budget) associated with the ML pipeline exploration process, allowing the system to halt or configure its exploration to prevent exceeding this user-specified cost.

In this example, a user can also use user interface 300 input elements 315/320 to indicate what type of computing instances (e.g., virtual machine types, where multiple different options may be made available having different resource characteristics, such as differing amounts of memory, processing capability, network availability, storage, etc.) are to be used for the ML model training jobs (via element 315), and what number of those instances are to be used (via element 320) at any point in time, allowing the user to control how fast the exploration occurs and at what expense. However, in some embodiments the user may select "auto" (or the like, meaning "automatic") and thus the system may select its own desired types and/or quantities of instances, e.g., based on previous exploration runs and/or based on a user-provided budget.

Figure 4:
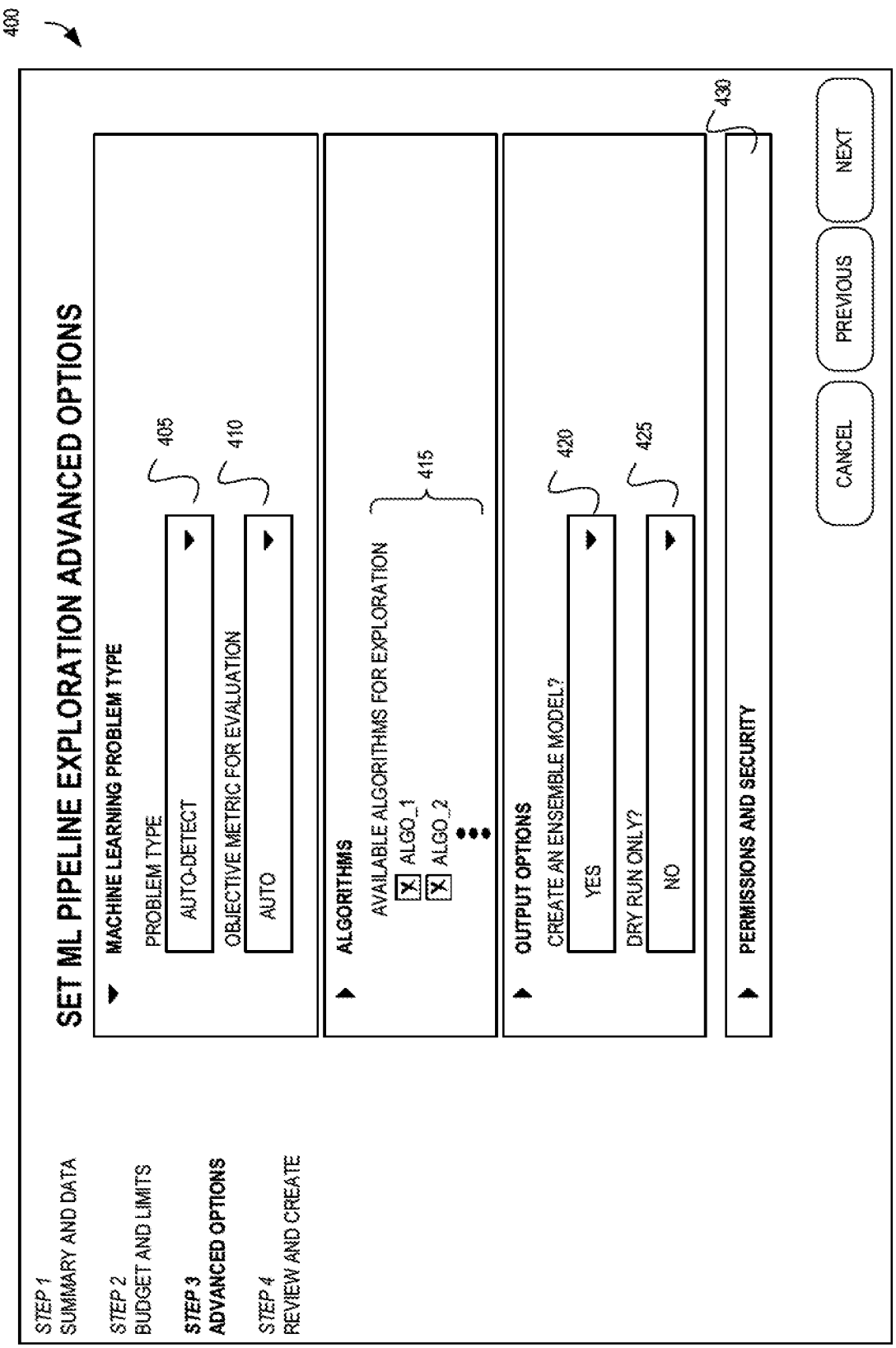
FIG. 4 is a diagram illustrating one exemplary user interface for configuring advanced options for automated machine learning pipeline exploration according to some embodiments.

In some embodiments, users having sufficient ML knowledge may be provided the ability to customize additional aspects of the ML pipeline exploration process. FIG. 4 is a diagram illustrating one exemplary user interface 400 for configuring advanced options for automated machine learning pipeline exploration according to some embodiments.

In this user interface 400, a user may specify via input element 405 what machine learning problem type is at hand, enabling the use to control what type of ML algorithms will be used for training. For example, many different machine learning problem types are known to those of skill in the art, such as binary classification, multi-class classification, linear regression, and so on. In some embodiments, the user may be able to select an "auto detection" option, as the machine learning problem type may be inferred based on the type and/or values of the "target column" the user specified.

A user may also specify an objective metric for the exploration. For example, user interface 400 includes a user interface element 410 where the user can select an objective metric type (e.g., from a list of metrics) that is to be used to evaluate which ML pipeline is the best for the user. In some embodiments, the objective metric can be "auto" (automatic), allowing the AMPGS 102 to use its own selected metric or metrics to determine a best-performing ML pipeline. Various types of metrics can be used and are known to those of skill in the art, including but not limited to mean square error (MSE), classification accuracy, logarithmic loss, area under curve (AUC), mean absolute error (MAE), root mean squared error (RMSE), root mean squared logarithmic error (RMSLE), R squared, F1 score, etc.

In some embodiments, a user may also configure via user interface element 415 what types of algorithms may be available to be tested by the AMPGS 102. The selection of particular algorithms that may potentially be used can enable advanced users to rule out certain algorithms or explore a limited number of specific algorithms of interest. The particular algorithms may be populated in the interface 400 based on the selected problem type 405, as it is well-known that certain algorithms are used for certain ML problem types. A variety of types of algorithms may be included as known to those of skill in the art, such as (but not limited to) XGBoost, a linear learner, k nearest neighbor (KNN), factorization machines, multi-layer perceptron (MLP), neural networks, etc.

The exemplary user interface 400 also includes an element 420 allowing a user to indicate (e.g., YES or NO) whether the AMPGS 102 should explore creating an ensemble model that is based on combining multiple other models. In some cases, an ensemble model can provide improved accuracy, e.g., via applying an ensemble approach that combines several base models to produce one optimal predictive model, such as via use of a bagging approach (e.g., building multiple models from different subsamples of the dataset), a random forest type approach, a boosting approach (e.g., building multiple models, where ones may learn to correct errors of other models), a stacking approach (e.g., a supervisor model or algorithm combines the predictions from multiple other models), or other approach known to those of skill in the art.

The exemplary user interface 400 also includes an element 425 allowing a user to indicate whether the exploration should be a "dry run" only, meaning that the AMPGS 102 is to identify multiple pipelines to explore and provide data describing these models to the user, but is not to actually perform any ML model training. In such cases, the AMPGS 102 may provide, via other user interfaces (e.g., of a console or an interactive code application) details identifying the specifics of multiple candidate pipelines that the user can examine. The user may then instruct the AMPGS 102 (e.g., via transmitting a request message) to perform the full exploration or perform only specific parts of the exploration—e.g., implementing one (or more) of the candidate pipelines, or even running parts of individual pipelines a step at a time (e.g., perform only data preprocessing and return the results, perform the training of a model, etc.).

The user interface 400 also can allow users to configure other aspects of an exploration, such as configuring particular permissions settings (e.g., providing an identifier of a user account or "role" to be used by the AMPGS 102 when performing operations within the provider network) or security settings (e.g., implementing network isolation for those instances performing exploration work so that they are unable to make any outbound network calls, placing the instance(s) within a particular private network, encrypting or decrypting data according to a user-provided key or algorithm).

Thereafter, the user may be provided a user interface allowing the user to start the ML pipeline exploration, resulting in a command being issued via a request message (sent as circle (2) of FIG. 1) to the AMPGS 102. Additionally, or alternatively, these configuration settings may be provided without the use of such graphical user interfaces, and instead may be issued by another type of application (executed in or out of the provider network) that may or may not have obtained concurrent user instruction as to these settings.

Thus, via these exemplary user interfaces 200/300/400 or via other ways (e.g., configuration files or database entries), an ML pipeline exploration job can be initiated. Turning back to FIG. 1, after receipt of a message indicating a desire to launch a job, at circle (3) the AMPGS 102 can initialize the use of a pipeline recommender system 112 to begin ML pipeline exploration.

The pipeline recommender system 112, in some embodiments, is responsible for determining the set of ML pipelines to explore and be optimized by the pipeline optimizer system 116. The pipeline recommender system 112, in some embodiments, can analyze the user's provided dataset and infer one or more of the probabilistic schema of the data set, target leakage, feature importance, the type of ML problem (e.g., classification, regression, etc.) based on the user-identified target column, etc. The pipeline recommender system 112 can use the dataset provided by the user and knowledge learned from metadata collected to recommend a promising and diverse set of feature processing pipelines to apply to the customer dataset along with the code for the feature processing model. The pipeline recommender system 112 can also recommend the hardware (compute instance type and count), identifiers of which hyperparameters to tune (and optionally their effective search space), and the degree of parallelization that the pipeline optimizer system 116 should use when exploring the ML pipelines. Thereafter, the pipeline optimizer system 116 can use the pipelines recommended by pipeline recommender system 112 to start an optimization job, which typically involves running multiple training jobs to identify the most performant ones. As the optimization job progresses, the pipeline optimizer system 116 can discard the low-performing models and can tune the hyperparameters of the most performant ones.

In some embodiments, users may utilize both the pipeline recommendation system 112 (to generate candidate ML pipelines to explore) as well as the pipeline optimizer system 116 (to explore and evaluate the candidate ML pipelines). However, in some embodiments users may use portions of the AMPGS 102 independently—e.g., only a pipeline recommendation system 112 to identify candidate ML pipelines (and thereafter use this data elsewhere), or only a pipeline optimization system 116 to evaluate candidate ML pipelines (e.g., using candidate ML pipelines that may have been developed with or without use of the pipeline recommendation system 112). Thus, in some embodiments these components are designed in a manner such that they are not tightly coupled, and may thus optionally be used independent of one another.

Figure 5:
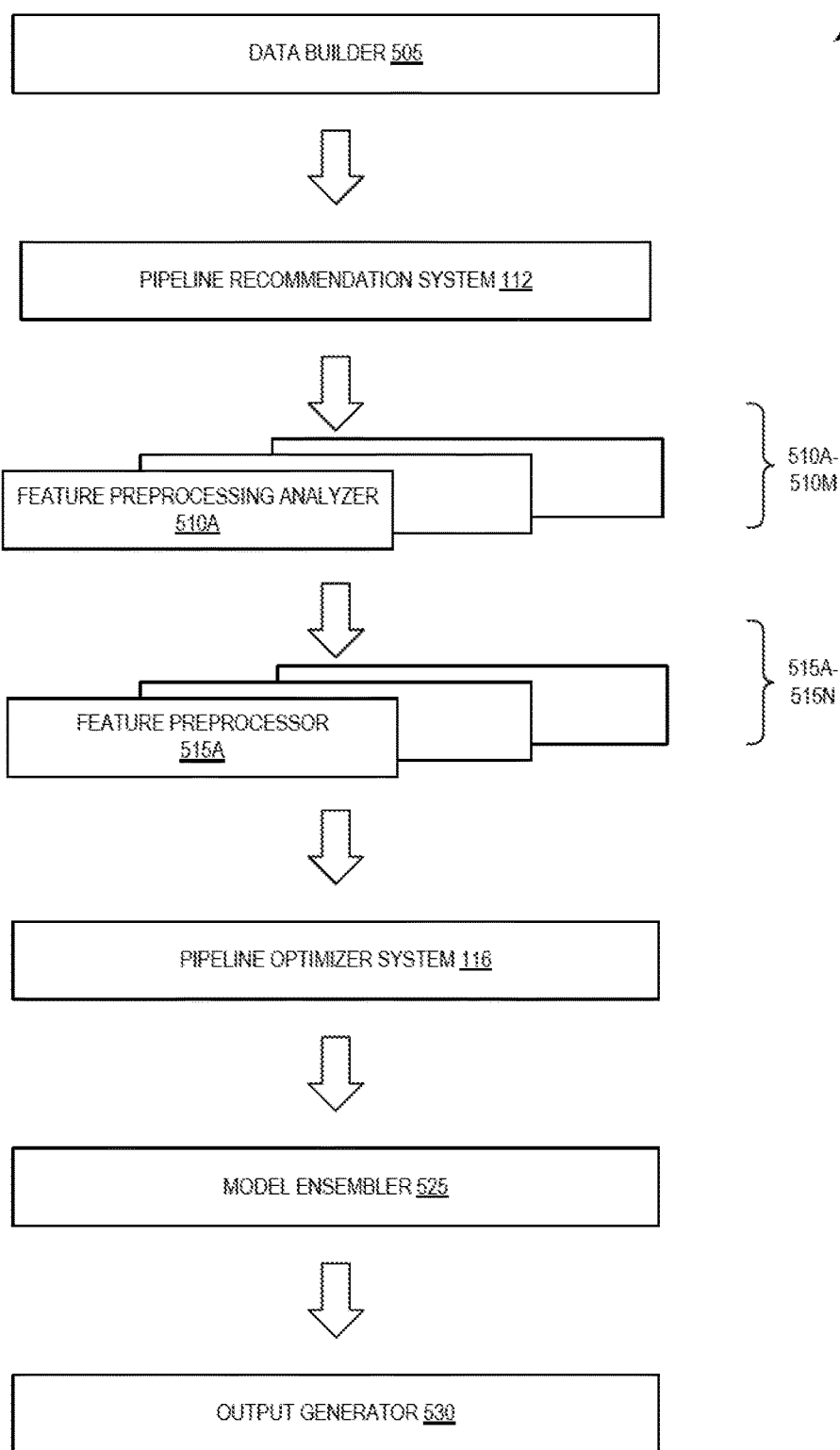
FIG. 5 is a diagram illustrating an exemplary set of processing jobs for automated machine learning pipeline exploration and deployment according to some embodiments.

For example, the operations of the AMPGS 102 (and the pipeline recommender system 112 and/or pipeline optimizer system 116) can be implemented as shown with regard to FIG. 5, which is a diagram illustrating an exemplary set of processing jobs for automated machine learning pipeline exploration and deployment according to some embodiments.

At block 505, a data builder component of the AMPGS 102 can obtain the dataset (e.g., by sending a request to a storage service based on a provided resource identifier) and perform preliminary operations with the dataset. For example, in some embodiments the data builder will split the dataset into three portions—one for training, one for validation, one for testing. In some embodiments, each of the three portions are equivalent in size (e.g., a same number of rows or a very similar number of rows (as in 334, 333, and 333 rows given a dataset of 1,000 rows)), though in other embodiments the portions are of dissimilar sizes (e.g., the training dataset may be much larger than either the validation or testing datasets). The preliminary operations may also include generating metadata describing the dataset (e.g., a total number of rows, a number of columns, data types of the columns, value distributions and other statistics based on values of the columns) that can be used as part of later processing, cleaning the dataset, or the like.

Next, the pipeline recommender system 112 can analyze the dataset (e.g., via use of one or more ML models along with the target column of the dataset, etc.) to recommend pipelines (a combination of one or more preprocessing tasks and a machine learning algorithm) to explore. For example, the pipeline recommender system 112 may utilize one or more ML models that have been trained to identify particular pipeline types that have worked well for particular datasets based on characteristics of those datasets (e.g., numbers and/or types of the columns, type of column to be inferred, etc.). Additionally, or alternatively, the pipeline recommender system 112 may use a database (or other data structure) of prior pipelines (and characteristics of the involved datasets) and compare the corresponding dataset/ inference characteristics of the current dataset to identify the most similar historic pipelines, which can be suggested.

Additionally, or alternatively, the pipeline recommender system 112 may generate a number of different preprocessing pipelines (and corresponding training datasets) according to "strategies" that have been configured—e.g., a "baseline" strategy that will 1-hot encode (1HE) all categorical variables, median-impute null values with indicators; a "quadratic" strategy that will hash-encode any detected categorical variables, bucketize numeric features, and add cartesian-product features for predictive feature combinations: instance-type×instance-count, num_layers×instance-type, dataset_size×num_layers; a "log bucketize" strategy that will hash-encode any categorical variables, bucketize numeric variables, and log-transform all numerics. For example, a feature processing pipeline may be generated using two machine learning jobs, which may be performed using a batch inference system 142 (that can train and/or host machine learning models in a batch manner) as shown at optional circle (3B): a training job to learn the transformations, and then a batch processing job to apply the transformation to the dataset to generate transformed datasets for use in exploring different ML models.

The pipeline recommender system 112 may identify a fixed number of pipelines to explore or a number provided by the user during the exploration configuration. As one example, the pipeline recommender system 112 may recommend up to ten pipelines to explore, such as (1) "apply one-hot encoding and principal component analysis (as the feature preprocessors/transforms) followed by use of the 'XGBOOST' algorithm with hyperparameter tuning", (2) "apply one-hot encoding and principal component analysis (as the feature preprocessors/transforms) followed by use of a 'linear learner' algorithm with hyperparameter tuning", (3) "apply principal component analysis (as the feature preprocessor/transform) followed by use of the 'XGBOOST' algorithm with hyperparameter tuning", and the like.

Turning back, momentarily, to FIG. 1, in some embodiments, after the pipeline recommender system 112 identifies different ML pipelines to be evaluated, details regarding these pipelines may be provided to the user 109 at optional circle (4), where the user 109 may provide confirmation to proceed with the complete exploration, halt the exploration, run only portions of the exploration (e.g., proceed with only some of the suggested pipelines, run only some portions of one pipeline), etc.

Assuming that the full exploration is to be continued, with reference to FIG. 5, a feature preprocessing analyzer 510A (e.g., each implemented by a separate one or more compute instance(s)) may run for each distinct preprocessing step/ transform identified within the recommended ML pipeline plans. Each feature preprocessing analyzer 510A-510M may perform an initialization of a preprocessing task so that the task can be later implemented by a feature preprocessor 515A-515N, and this analysis may be performed at least partially in parallel.

For example, a feature preprocessing analyzer 510A for one-hot encoding may need to run a ML job to find out how many columns it should produce. Thus, it could be the case that a column of a dataset may have 10,000 unique values, where many of these values are only referenced once or twice. Accordingly, the feature preprocessing analyzer 510A may determine to only generate columns for the top X (e.g., 200) values and one column as a "catch-all" for any other value. Thus, the feature preprocessing analyzer 510A will perform this analysis, which may include identifying what all distinct categories are referenced within a column, what the counts of each of these values are, etc., to ultimately determine to what columns should be generated. Similar types of preprocessing analysis can be performed for other types of pipeline preprocessing tasks, e.g., for principal component analysis there is a need to learn the result (e.g., which features should be used), etc.

Thereafter, the actual preprocessing can be performed by a set of feature preprocessors 515A-515N, where each preprocessor may implement a particular preprocessing step, or may implement multiple preprocessing steps (e.g., for one pipeline). The feature preprocessors 515A-515N may thus use the data from the feature preprocessing analyzers to apply the preprocessing operations/transforms to the dataset (e.g., a row at a time), optionally at least partially in parallel, to yield a transformed output dataset (or portion thereof).

Notably, in some embodiments during the preprocessing analysis and/or the actual preprocessing, the AMPGS 102 may provide updates to the user 109 (e.g., via an application 103 such as a console 105 and/or interactive code application 107 such as a Jupyter Notebook), who may view the intermediate results, halt these tasks (or the entire ML pipeline exploration), modify the tasks, etc.

Next, the pipeline optimizer system 116 (also with reference to circle (5) of FIG. 1) can utilize the preprocessed datasets and pipeline recommendations (including identifiers of the particular ML algorithms to be used to generate ML models) and can cause the multiple ML models to be trained accordingly, e.g., by calling a model training system 120 described herein (optionally in parallel), utilizing a ML framework, etc., according to any user-stipulated configuration parameters (e.g., how many trials are to be run in total, how many trials can be run at a time, what type of compute instances to use, etc.). The result of each training includes the model artifacts, together with the value of the objective metric to be optimized. The pipeline optimizer system 116 may use this information, e.g., via use of another one or more ML models or databases, to identify additional ML pipeline variants to test (having different hyperparameter values, for example) that are likely to result in a good model. Such hyperparameter tuning systems and techniques are known to those of skill in the art and can be utilized to work to find better and better pipelines.

Notably, in some embodiments during these training trials, the AMPGS 102 may provide updates to the user 109 via an application 103 (e.g., via a console 105 and/or interactive code application 107 such as a Jupyter Notebook), who may view the intermediate results, halt certain trainings (or the entire ML pipeline exploration), etc.

A model ensembler 525 may also be utilized to create one or more ensemble models, if desired by the user or configured by the system, based on use of ones of the explored models. For example, as indicated above, multiple models can be used in an ensemble using one or more ensemble techniques known to those of skill in the art (e.g., using some sort of aggregation or selection of outputs). Based on all results, an output generator 530 may produce output in the form of one or more of a comprehensive result in the form of updated result data to be viewed by the user (e.g., at optional circle (6)), a package of the pipeline exploration artifacts 122 (e.g., code 123 for implementing a preprocessing pipeline, which may include ML models, and/or inference model(s) 124) stored at a storage location (with reference to optional circle (7A) of FIG. 1) to be later obtained by the user or another application, results stored to a database, etc.

Returning to FIG. 1, in some scenarios, a user 109 may view the results of the exploration and choose to deploy a pipeline for use. In this case, the user's computing device 104 may issue a command to deploy a particular pipeline, and in response at optional circle (7B) the AMPGS 102 may send one or more commands (e.g., API calls) to a model hosting system 140 described further herein to "host" the pipeline—e.g., launch or reserve one or more compute instances, run pipeline code 126, configure endpoints associated with the pipeline (that can receive inference requests from outside clients and provide the requests to the pipeline), etc. As one example, the commands may include a "create model" API call that combines code for the model (e.g., inference code implemented within a container) along with model artifacts (e.g., data describing weights associated with various aspects of the model) to yield a model that can be hosted (e.g., by a model hosting system 140 or batch inference system 142), where the create model request may include one or more of a name for the model, an identifier of a container with inference code, one or more identifiers of other containers in the inference pipeline, a set of permissions or roles for the model when executing, a set of user-defined tags to be associated with the model, or the like. The command(s) may also include a "create endpoint" (or "create transform job" in the case of batch inference) API call that deploys all pipeline components needed for the model (e.g., sets up the container(s) needed for preprocessing, the container(s) needed for the actual inference, associated routing, etc.).

Thus, as indicated above, at optional circle (7C) the AMPGS 102 may send one or more commands (e.g., API calls) to a batch inference system 142 to "host" the pipeline for use in performing batch inferences. The batch inference system 142 may be implemented similarly to the model hosting system 140 described herein, but may be optimized for performing inferences in batch—e.g., via input data stored at a storage service location, storing results back to a storage location, etc., as opposed to performing real-time synchronous inference. This deployment or deployments may also be performed automatically upon the conclusion of the pipeline exploration process, where the AMPGS 102 can automatically deploy a "best" performing pipeline. Thereafter, a client application 130A-130B at optional circle (8) inside the provider network (such as one executed by an application run by an internal service 132 such as a hardware virtualization service or a code execution service) or outside the provider network (e.g., by a computing device 104) may issue inference requests to the endpoint associated with the deployed pipeline code 126, enabling the pipeline to generate an inference and return that result back to the application.

Figure 6:
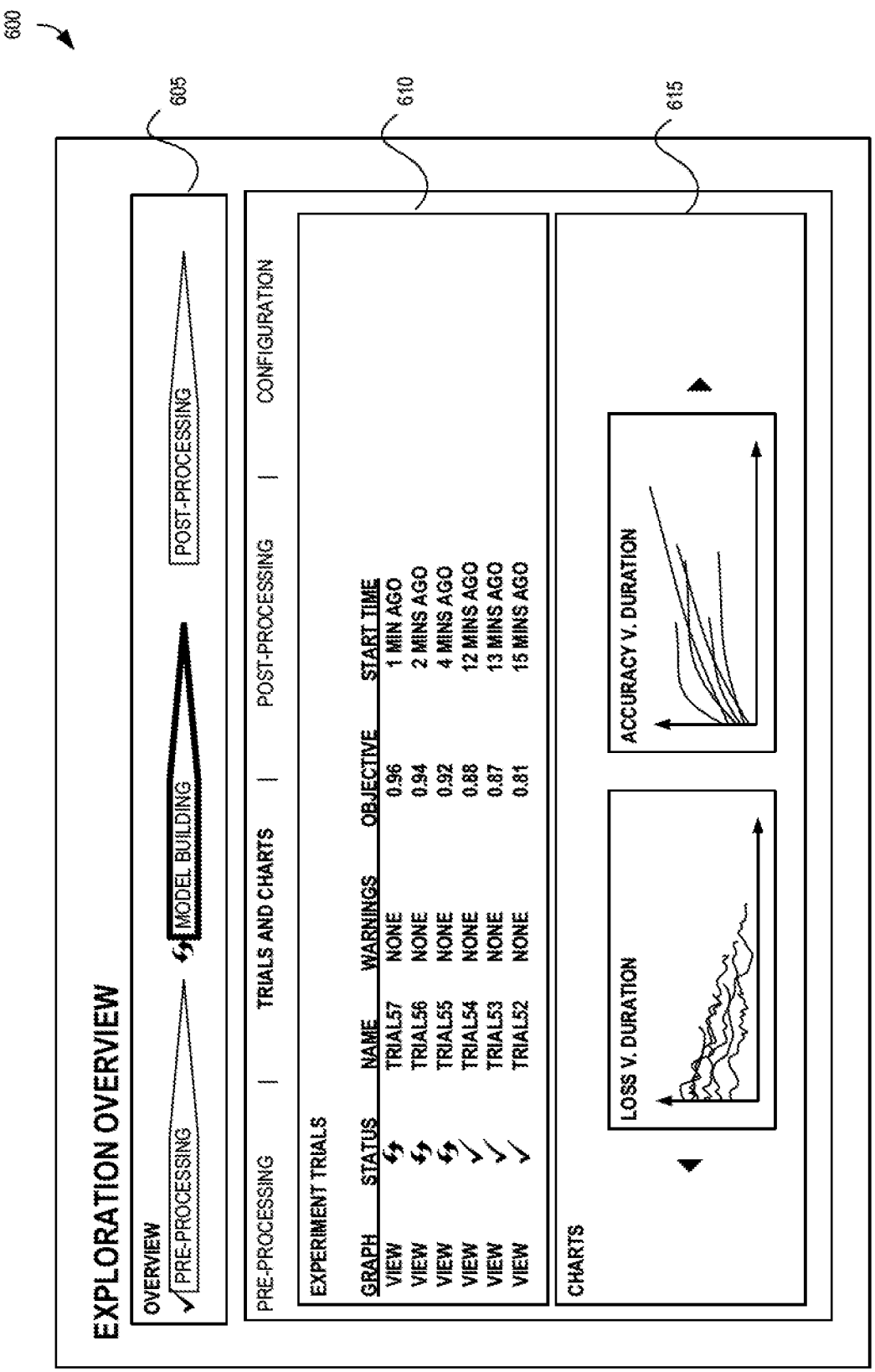
FIG. 6 is a diagram illustrating one exemplary user interface for monitoring trials of an automated machine learning pipeline exploration according to some embodiments.

As indicated throughout, the ongoing status and/or intermediate (or final) results of the exploration can be provided to the user in a "white box" fashion, allow the user full visibility into what is proposed to be done, what is actually being done, and what has resulted. For example, FIG. 6 is a diagram illustrating one exemplary user interface 600 for monitoring trials of an automated machine learning pipeline exploration according to some embodiments. In this user interface 600, a first panel 605 displays the stage of the exploration—e.g., the pre-processing phase, the model building phase, a post-processing phase, etc. In this example, the model building phase is ongoing.

A second panel 610 shows an overview of the "trials" (or model trainings) for the exploration—here, three models are actively being trained (referred to as TRIAL55, TRIAL56, and TRIAL57), and ones of these columns in the table may be selectable to view additional information about each trial, ranging from graphs of their intermediate results, details of any warnings/issues, details of the particular trial (e.g., identifiers of the preprocessing, model algorithm type, hyperparameters being tested), etc. A third panel 610 shows various charts depicting results of the entire exploration so far—here, the loss of the models over time as the models are trained, the accuracy of the models over time as the models are trained, etc.

Figure 7:
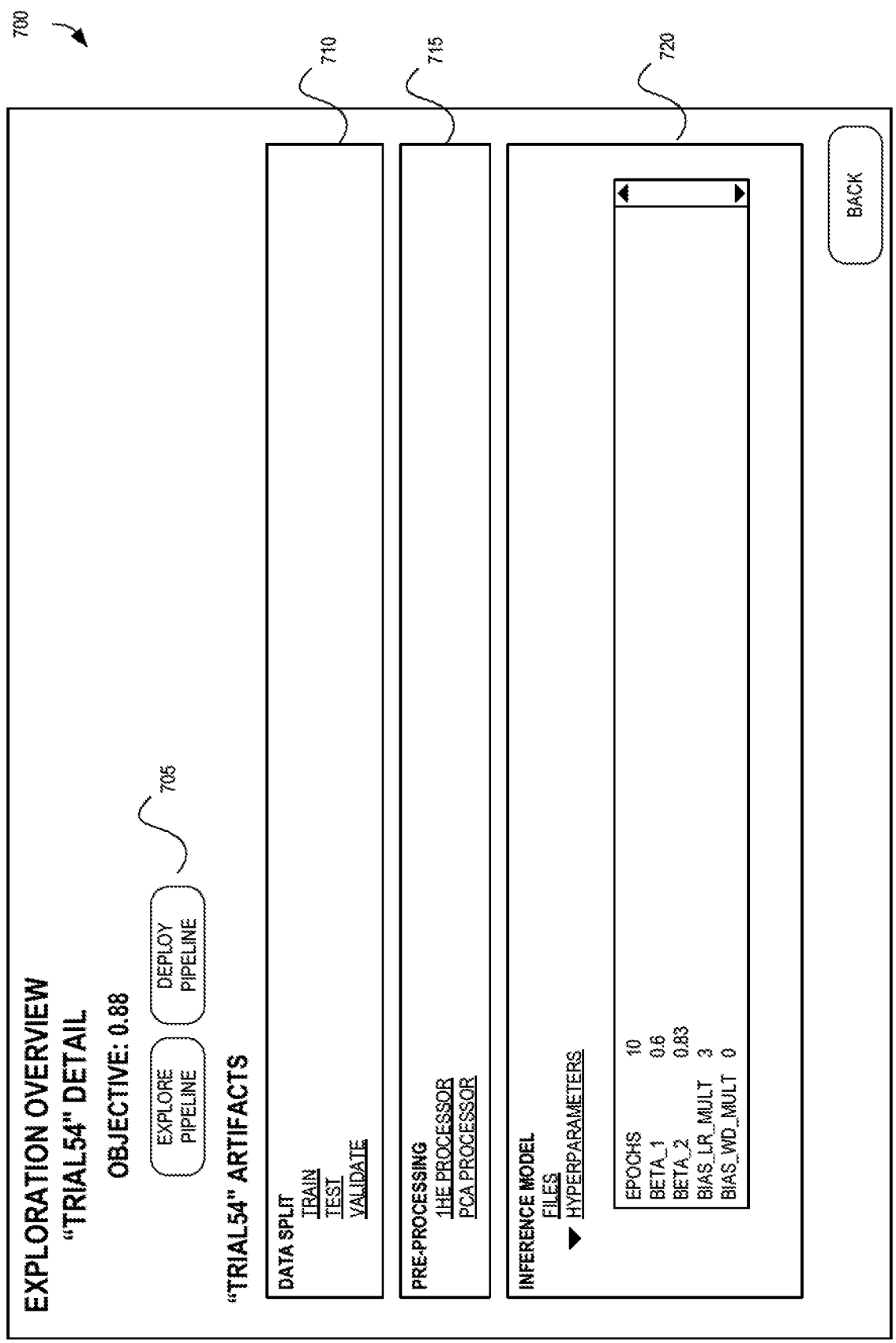
FIG. 7 is a diagram illustrating one exemplary user interface for viewing trial results of an automated machine learning pipeline exploration according to some embodiments.

For additional detail, FIG. 7 is a diagram illustrating one exemplary user interface 700 for viewing trial results of an automated machine learning pipeline exploration according to some embodiments. This user interface 700 may be displayed, for example, when a user selects a particular trial in the second panel 610 of FIG. 6 and presents additional detail about a particular trial. In this example, a first panel 705 shows the trial name while presenting user interface input elements (here, buttons) allowing the user to further explore the pipeline and/or deploy the pipeline. A second panel 710 allows the user to view/download each set of data resulting from the split of the dataset, while a third panel 715 allows the user to view/download the pre-processing related information (e.g., preprocessing code—such as a preprocessing ML model—and/or resulting dataset) and a fourth panel 720 allows the user to view/download other pipeline artifacts (e.g., model code/weights, hyperparameter values).

FIG. 8 is a diagram illustrating one exemplary interactive code exploration user interface 800 for viewing and/or modifying an automated machine learning pipeline exploration according to some embodiments. As shown in FIG. 8, an interactive code exploration may be presented to a user (e.g., via a web browser as a web application) that allows the user to explore code, run code, modify and run code, etc. In some embodiments, code for performing ML pipeline exploration may be presented to users to provide the users visibility into what particular pipelines are recommended to be tested, what preprocessing operations will be used, etc. Moreover, users can "run" this code (e.g., via selecting a user interface element such as a button, causing the application to send a request to the provider network for the code to actually be executed) in its original form or in modified form (e.g., by the user editing the code). In this example, the interactive code exploration user interface 800 includes a first code section 805 including some definitional code, e.g., giving the exploration a name, setting up storage location paths, importing code from libraries, and the like.

The interactive code exploration user interface 800 also includes a second code section 810 that defines multiple different ways to preprocess a training dataset. In this example, the dataset is configured with the code to pre-process the dataset in a variety of different ways to compare which technique(s) work best, which may include training feature processing models, and then running "batch" transform jobs to actually apply the transformations.

As shown, a first pipeline "FP_BASELINE" is defined with a first "FPO" step, which is defined (as a training job to learn the transformations) with values for a source directory, instance types and counts, and other non-illustrated values such as an ML framework version to be used, a set of tags to be applied, an identifier of a feature processing strategy (e.g., a baseline strategy that performs a 1-hot encoding of all categorical variables and does a median-impute null values with indicators; a quadratic strategy that does a hash-encoding of categorical variables, bucketization of numerics, addition of cartesian-product features for predictive feature combinations; or other strategies) to use. A complimentary "BTO" step for the first pipeline is also defined (as a batch processing job to apply the transformations to the dataset), which may define such values as an instance type, instance count, an output path, a set of tags, and the like. These two steps together may form one feature processing pipeline, and many pairs of these steps (that is, many feature processing pipelines) may be defined to create multiple different feature processing pipelines.

The interactive code exploration user interface 800 may also include a section 815 to display results of the pipelines being run, and finally, a code section 820 to define different combinations of machine learning models and pipelines, each including values for a name, an ML algorithm to use, a set of hyperparameters, an identifier of a storage location storing a particular set of input values generated by one of the feature processing pipelines, and the like.

Figure 9:
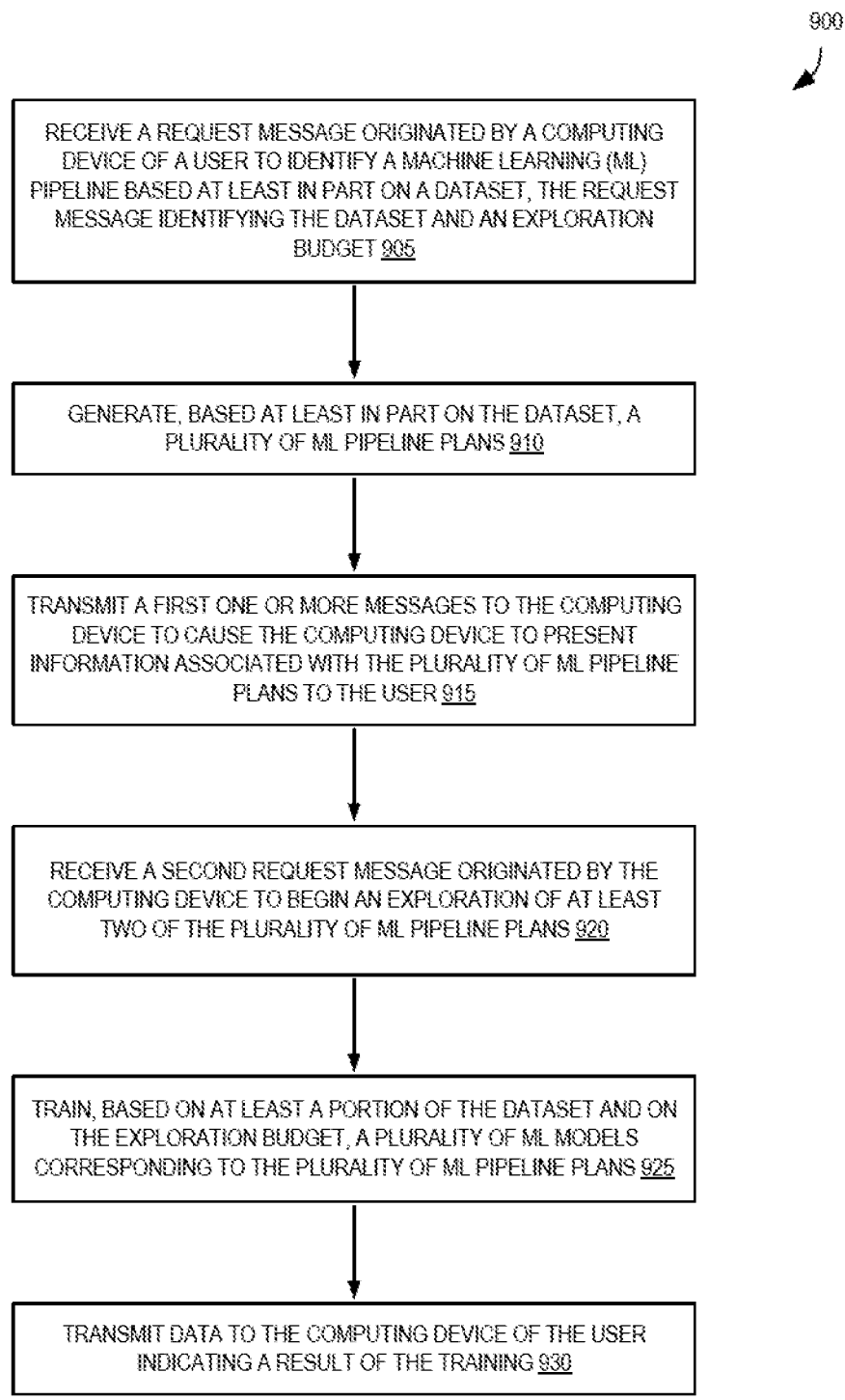
FIG. 9 is a flow diagram illustrating operations of a method for automated machine learning pipeline exploration and deployment according to some embodiments.

FIG. 9 is a flow diagram illustrating operations 900 of a method for automated machine learning pipeline exploration and deployment according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by AMPGS 102 of the other figures.

The operations 900 include, at block 905, receiving a request message originated by a computing device of a user to identify a machine learning (ML) pipeline based at least in part on a dataset, the request message identifying the dataset and an exploration budget. In some embodiments, the exploration budget indicates a maximum number of ML models to be trained as part of the training, and wherein the number of the plurality of ML models is the maximum number. In some embodiments, the exploration budget may also be a maximum amount of time associated with an aspect of the training, or a maximum cost associated with the training.

In some embodiments, the first request message includes a resource identifier of a storage location of the dataset, and the operations 900 further include obtaining, by a machine learning service of a multi-tenant provider network, the dataset from a storage service via use of the resource identifier.

The operations 900 further include, at block 910, generating, based at least in part on the dataset, a plurality of ML pipeline plans.

In some embodiments, the operations 900 further include, at block 915, transmitting a first one or more messages to the computing device to cause the computing device to present information associated with the plurality of ML pipeline plans to the user, and at block 920, receiving a second request message originated by the computing device to begin an exploration of at least two of the plurality of ML pipeline plans.

In some embodiments, the information associated with the plurality of ML pipeline plans includes, for each of the ML pipeline plans, an identifier of one or more preprocessing stages and a ML model algorithm type. In some embodiments, the information is presented to the user by the computing device via an interactive code application, and the operations 900 further include: receiving a third request message originated by the computing device of the user indicating a request to perform one pipeline of one of the plurality of ML pipeline plans. In some embodiments, operations 900 further include receiving a fourth request message originated by the computing device of the user indicating a request to perform a modified pipeline of one of the plurality of ML pipeline plans, wherein the modified pipeline was specified by the user based on the one ML pipeline plan.

The operations 900 further include, at block 925, training, based on at least a portion of the dataset and on the exploration budget, a plurality of ML models corresponding to the plurality of ML pipeline plans.

In some embodiments, the operations 900 further include splitting the dataset into a plurality of sets, the plurality of sets including a training set, wherein the training of the plurality of the plurality of ML models utilizes at least the training set.

In some embodiments, the training of the plurality of ML models is performed at least partially in parallel in that at least two of the plurality of ML models are actively trained at least partially at a same point in time.

The operations 900 further include, at block 930, transmitting data to the computing device of the user indicating a result of the training.

In some embodiments, operations 900 further include receiving a fifth request message originated by the computing device of the user indicating a request to deploy an ML pipeline corresponding to one of the plurality of ML pipeline plans; transmitting a sixth request message to cause a model hosting system of a provider network to deploy the ML pipeline behind an endpoint; and transmitting an identifier of the endpoint to the computing device or to a storage location.

In some embodiments, the transmitting of the of the second one or more messages to the computing device of the user causes the computing device of the user to present the result to the user, the result including identifiers of a plurality of trials corresponding to the plurality of ML models, wherein for each of the plurality of trials the result includes a value of an objective metric generated by the training of the corresponding ML model. In some embodiments, the first request message further identifies the objective metric.

In some embodiments, operations 900 further include generating another ML pipeline including an ensemble ML model based on at least two of the plurality of ML models.

Figure 10:
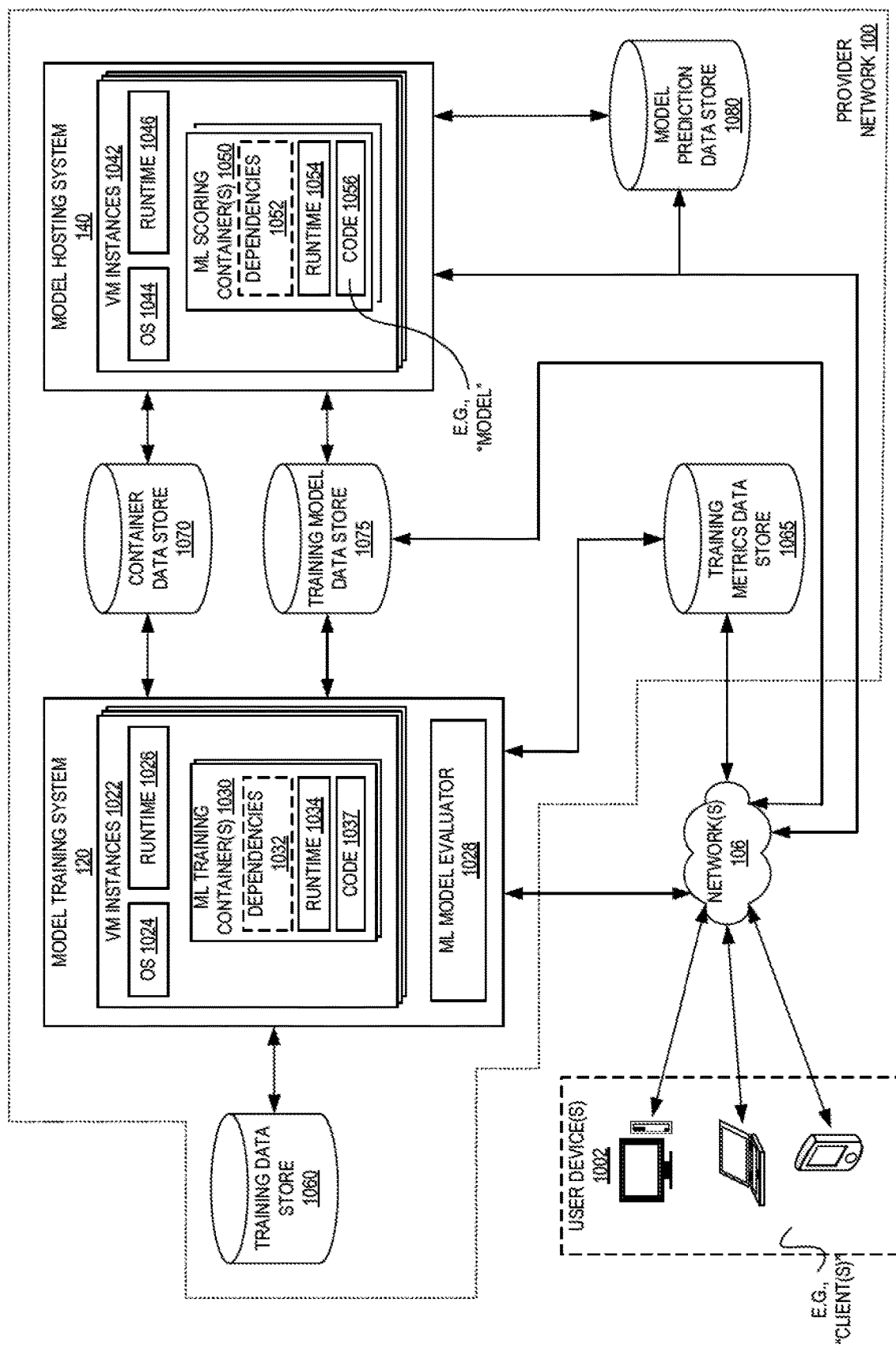
FIG. 10 is a block diagram of an illustrative operating environment in which machine learning models are trained and hosted according to some embodiments.

FIG. 10 is a block diagram of an illustrative operating environment in which machine learning models are trained and hosted according to some embodiments. The operating environment includes end user devices 1002 (e.g., a PC or mobile device such as computing device 104), a model training system 120, a model hosting system 140, a training data store 1060, a training metrics data store 1065, a container data store 1070, a training model data store 1075, and a model prediction data store 1080. A machine learning service 110 described herein may include one or more of these entities, such as the model hosting system 140, model training system 120, etc.

In some embodiments, users, by way of user devices 1002, interact with the model training system 120 to provide data that causes the model training system 120 to train one or more machine learning models. A machine learning model, generally, may be thought of as one or more equations that are "trained" using a set of data. In some embodiments, the model training system 120 provides ML functionalities as a Web service, and thus messaging between user devices 1002 and the model training system 120 (or provider network 100), and/or between components of the model training system 120 (or provider network 100), may utilize HTTP messages to transfer data in a machine-readable file format, such as XML or JSON.

The user devices 1002 can interact with the model training system 120 via frontend 1029 of the model training system 120. For example, a user device 1002 can provide a training request to the frontend 1029 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 1002, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 1002 may provide, in the training request, an algorithm written in any programming language. The model training system 120 packages the algorithm into a container (optionally with other code, such as a "base" ML algorithm supplemented with user-provided code) that is eventually loaded into a virtual machine instance 1022 for training a machine learning model, as described in greater detail below. For example, a user, via a user device 1002, may develop an algorithm/code using an application (e.g., an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 1002 provides, in the training request, an indicator of a container image (e.g., an indication of an address or a location at which a container image is stored). For example, the container image can be stored in a container data store 1070, and this container image may have been previously created/uploaded by the user. The model training system 120 can retrieve the container image from the indicated location and create a container using the retrieved container image. The container is then loaded into a virtual machine instance 1022 for training a machine learning model, as described in greater detail below.

The model training system 120 can use the information provided by the user device 1002 to train a machine learning model in one or more pre-established virtual machine instances 1022 in some embodiments. In particular, the model training system 120 includes a single physical computing device or multiple physical computing devices that are interconnected using one or more computing networks (not shown), where the physical computing device(s) host one or more virtual machine instances 1022. The model training system 120 can handle the acquisition and configuration of compute capacity (e.g., containers, instances, etc., which are described in greater detail below) based on the information describing the computing machine on which to train a machine learning model provided by the user device 1002. The model training system 120 can then train machine learning models using the compute capacity, as is described in greater detail below. The model training system 120 can automatically scale up and down based on the volume of training requests received from user devices 1002 via frontend 1029, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 1022 are utilized to execute tasks. For example, such tasks can include training a machine learning model. As shown in FIG. 10, each virtual machine instance 1022 includes an operating system (OS) 1024, a language runtime 1026, and one or more ML training containers 1030. Generally, the ML training containers 1030 are logical units created within a virtual machine instance using the resources available on that instance and can be utilized to isolate execution of a task from other processes (e.g., task executions) occurring in the instance. In some embodiments, the ML training containers 1030 are formed from one or more container images and a top container layer. Each container image may further include one or more image layers, where each image layer represents an executable instruction. As described above, some or all of the executable instructions together represent an algorithm that defines a machine learning model. Changes made to the ML training containers 1030 (e.g., creation of new files, modification of existing files, deletion of files, etc.) are stored in the top container layer. If a ML training container 1030 is deleted, the top container layer is also deleted. However, the container image(s) that form a portion of the deleted ML training container 1030 can remain unchanged. The ML training containers 1030 can be implemented, for example, as Linux containers (LXC), Docker containers, and the like.

The ML training containers 1030 may include individual a runtime 1034, code 1037, and dependencies 1032 needed by the code 1037 in some embodiments. The runtime 1034 can be defined by one or more executable instructions that form at least a portion of a container image that is used to form the ML training container 1030 (e.g., the executable instruction(s) in the container image that define the operating system and/or runtime to run in the container formed from the container image). The code 1037 includes one or more executable instructions that form at least a portion of a container image that is used to form the ML training container 1030. For example, the code 1037 includes the executable instructions in the container image that represent an algorithm that defines a machine learning model, which may reference (or utilize) code or libraries from dependencies 1032. The runtime 1034 is configured to execute the code 1037 in response to an instruction to begin machine learning model training. Execution of the code 1037 results in the generation of model data, as described in greater detail below.

In some embodiments, the code 1037 includes executable instructions that represent algorithms that define different machine learning models. For example, the code 1037 includes one set of executable instructions that represent a first algorithm that defines a first machine learning model and a second set of executable instructions that represent a second algorithm that defines a second machine learning model. In some embodiments, the virtual machine instance 1022 executes the code 1037 and trains all of the machine learning models. In some embodiments, the virtual machine instance 1022 executes the code 1037, selecting one of the machine learning models to train. For example, the virtual machine instance 1022 can identify a type of training data indicated by the training request and select a machine learning model to train (e.g., execute the executable instructions that represent an algorithm that defines the selected machine learning model) that corresponds with the identified type of training data.

In some embodiments, the runtime 1034 is the same as the runtime 1026 utilized by the virtual machine instance 1022. In some embodiments, the runtime 1034 is different than the runtime 1026 utilized by the virtual machine instance 1022.

In some embodiments, the model training system 120 uses one or more container images included in a training request (or a container image retrieved from the container data store 1070 in response to a received training request) to create and initialize a ML training container 1030 in a virtual machine instance 1022. For example, the model training system 120 creates a ML training container 1030 that includes the container image(s) and/or a top container layer.

Prior to beginning the training process, in some embodiments, the model training system 120 retrieves training data from the location indicated in the training request. For example, the location indicated in the training request can be a location in the training data store 1060. Thus, the model training system 120 retrieves the training data from the indicated location in the training data store 1060. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 1022 training the machine learning model. Once the virtual machine instance 1022 has applied and used the retrieved portion or once the virtual machine instance 1022 is about to use all of the retrieved portion (e.g., a buffer storing the retrieved portion is nearly empty), then the model training system 120 can retrieve a second portion of the training data and provide the second retrieved portion to the virtual machine instance 1022, and so on.

To perform the machine learning model training, the virtual machine instance 1022 executes code 1037 stored in the ML training container 1030 in some embodiments. For example, the code 1037 includes some or all of the executable instructions that form the container image of the ML training container 1030 initialized therein. Thus, the virtual machine instance 1022 executes some or all of the executable instructions that form the container image of the ML training container 1030 initialized therein to train a machine learning model. The virtual machine instance 1022 executes some or all of the executable instructions according to the hyperparameter values included in the training request. As an illustrative example, the virtual machine instance 1022 trains a machine learning model by identifying values for certain parameters (e.g., coefficients, weights, centroids, etc.). The identified values depend on hyperparameters that define how the training is performed. Thus, the virtual machine instance 1022 can execute the executable instructions to initiate a machine learning model training process, where the training process is run using the hyperparameter values included in the training request. Execution of the executable instructions can include the virtual machine instance 1022 applying the training data retrieved by the model training system 120 as input parameters to some or all of the instructions being executed.

In some embodiments, executing the executable instructions causes the virtual machine instance 1022 (e.g., the ML training container 1030) to generate model data. For example, the ML training container 1030 generates model data and stores the model data in a file system of the ML training container 1030. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 1030 such that the model data is written to the top container layer of the ML training container 1030 and/or the container image(s) that forms a portion of the ML training container 1030 is modified to include the model data.

The virtual machine instance 1022 (or the model training system 120 itself) pulls the generated model data from the ML training container 1030 and stores the generated model data in the training model data store 1075 in an entry associated with the virtual machine instance 1022 and/or the machine learning model being trained. In some embodiments, the virtual machine instance 1022 generates a single file that includes model data and stores the single file in the training model data store 1075. In some embodiments, the virtual machine instance 1022 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 1022 can package the multiple files into a single file once training is complete and store the single file in the training model data store 1075. Alternatively, the virtual machine instance 1022 stores the multiple files in the training model data store 1075. The virtual machine instance 1022 stores the file(s) in the training model data store 1075 while the training process is ongoing and/or after the training process is complete.

In some embodiments, the virtual machine instance 1022 regularly stores model data file(s) in the training model data store 1075 as the training process is ongoing. Thus, model data file(s) can be stored in the training model data store 1075 at different times during the training process. Each set of model data files corresponding to a particular time or each set of model data files present in the training model data store 1075 as of a particular time could be checkpoints that represent different versions of a partially-trained machine learning model during different stages of the training process. Accordingly, before training is complete, a user, via the user device 1002 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 1075.

In some embodiments, a virtual machine instance 1022 executes code 1037 stored in a plurality of ML training containers 1030. For example, the algorithm included in the container image can be in a format that allows for the parallelization of the training process. Thus, the model training system 120 can create multiple copies of the container image provided in a training request and cause the virtual machine instance 1022 to load each container image copy in a separate ML training container 1030. The virtual machine instance 1022 can then execute, in parallel, the code 1037 stored in the ML training containers 1030. The virtual machine instance 1022 can further provide configuration information to each ML training container 1030 (e.g., information indicating that 'N' ML training containers 1030 are collectively training a machine learning model and that a particular ML training container 1030 receiving the configuration information is ML training container 1030 number X of N), which can be included in the resulting model data. By parallelizing the training process, the model training system 120 can significantly reduce the training time in some embodiments.

In some embodiments, a plurality of virtual machine instances 1022 execute code 1037 stored in a plurality of ML training containers 1030. For example, the resources used to train a particular machine learning model can exceed the limitations of a single virtual machine instance 1022. However, the algorithm included in the container image can be in a format that allows for the parallelization of the training process. Thus, the model training system 120 can create multiple copies of the container image provided in a training request, initialize multiple virtual machine instances 1022, and cause each virtual machine instance 1022 to load a container image copy in one or more separate ML training containers 1030. The virtual machine instances 1022 can then each execute the code 1037 stored in the ML training containers 1030 in parallel. The model training system 120 can further provide configuration information to each ML training container 1030 via the virtual machine instances 1022 (e.g., information indicating that N ML training containers 1030 are collectively training a machine learning model and that a particular ML training container 1030 receiving the configuration information is ML training container 1030 number X of N, information indicating that M virtual machine instances 1022 are collectively training a machine learning model and that a particular ML training container 1030 receiving the configuration information is initialized in virtual machine instance 1022 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 1022 that execute the code 1037. Thus, the parallelization can occur over different physical computing devices in addition to over different virtual machine instances 1022 and/or ML training containers 1030.

In some embodiments, the model training system 120 includes a ML model evaluator 1028. The ML model evaluator 1028 can monitor virtual machine instances 1022 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 1028 can obtain the model data for a machine learning model being trained and evaluation data from the training data store 1060. The evaluation data is separate from the data used to train a machine learning model and includes both input data and expected outputs (e.g., known results), and thus the ML model evaluator 1028 can define a machine learning model using the model data and execute the machine learning model by providing the input data as inputs to the machine learning model. The ML model evaluator 1028 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 1028 periodically generates model metrics during the training process and stores the model metrics in the training metrics data store 1065 in some embodiments. While the machine learning model is being trained, a user, via the user device 1002, can access and retrieve the model metrics from the training metrics data store 1065. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 1002, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 1022 to optionally delete an existing ML training container 1030, create and initialize a new ML training container 1030 using some or all of the information included in the request, and execute the code 1037 stored in the new ML training container 1030 to restart the machine learning model training process. As another example, the model training system 120 can cause the virtual machine instance 1022 to modify the execution of code stored in an existing ML training container 1030 according to the data provided in the modification request. In some embodiments, the user, via the user device 1002, can transmit a request to the model training system 120 to stop the machine learning model training process. The model training system 120 can then instruct the virtual machine instance 1022 to delete the ML training container 1030 and/or to delete any model data stored in the training model data store 1075.

As described below, in some embodiments, the model data stored in the training model data store 1075 is used by the model hosting system 140 to deploy machine learning models. Alternatively, or additionally, a user device 1002 or another computing device (not shown) can retrieve the model data from the training model data store 1075 to implement a learning algorithm in an external device. As an illustrative example, a robotic device can include sensors to capture input data. A user device 1002 can retrieve the model data from the training model data store 1075 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 1022 are shown in FIG. 10 as a single grouping of virtual machine instances 1022, some embodiments of the present application separate virtual machine instances 1022 that are actively assigned to execute tasks from those virtual machine instances 1022 that are not actively assigned to execute tasks. For example, those virtual machine instances 1022 actively assigned to execute tasks are grouped into an "active pool," while those virtual machine instances 1022 not actively assigned to execute tasks are placed within a "warming pool." In some embodiments, those virtual machine instances 1022 within the warming pool can be pre-initialized with an operating system, language runtimes, and/or other software required to enable rapid execution of tasks (e.g., rapid initialization of machine learning model training in ML training container(s) 1030) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 1002, the model hosting system 140, etc.). The processing unit can also communicate to and from a memory of a virtual machine instance 1022 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 1042. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 1002 via frontend 1049 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 1042 are utilized to execute tasks. For example, such tasks can include executing a machine learning model. As shown in FIG. 10, each virtual machine instance 1042 includes an operating system (OS) 1044, a language runtime 1046, and one or more ML scoring containers 1050. The ML scoring containers 1050 are similar to the ML training containers 1030 in that the ML scoring containers 1050 are logical units created within a virtual machine instance using the resources available on that instance and can be utilized to isolate execution of a task from other processes (e.g., task executions) occurring in the instance. In some embodiments, the ML scoring containers 1050 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 1050 (e.g., creation of new files, modification of existing files, deletion of files, etc.) are stored in the top container layer. If a ML scoring container 1050 is deleted, the top container layer is also deleted. However, the container image(s) that form a portion of the deleted ML scoring container 1050 can remain unchanged. The ML scoring containers 1050 can be implemented, for example, as Linux containers.

The ML scoring containers 1050 each include a runtime 1054, code 1056, and dependencies 1052 (e.g., supporting software such as libraries) needed by the code 1056 in some embodiments. The runtime 1054 can be defined by one or more executable instructions that form at least a portion of a container image that is used to form the ML scoring container 1050 (e.g., the executable instruction(s) in the container image that define the operating system and/or runtime to run in the container formed from the container image). The code 1056 includes one or more executable instructions that form at least a portion of a container image that is used to form the ML scoring container 1050. For example, the code 1056 includes the executable instructions in the container image that represent an algorithm that defines a machine learning model, which may reference dependencies 1052. The code 1056 can also include model data that represent characteristics of the defined machine learning model, as described in greater detail below. The runtime 1054 is configured to execute the code 1056 in response to an instruction to begin execution of a machine learning model. Execution of the code 1056 results in the generation of outputs (e.g., predicted or "inferred" results), as described in greater detail below.

In some embodiments, the runtime 1054 is the same as the runtime 1046 utilized by the virtual machine instance 1042. In some embodiments, runtime 1054 is different than the runtime 1046 utilized by the virtual machine instance 1042.

In some embodiments, the model hosting system 140 uses one or more container images included in a deployment request (or a container image retrieved from the container data store 1070 in response to a received deployment request) to create and initialize a ML scoring container 1050 in a virtual machine instance 1042. For example, the model hosting system 140 creates a ML scoring container 1050 that includes the container image(s) and/or a top container layer.

As described above, a user device 1002 can submit a deployment request and/or an execution request to the model hosting system 140 via the frontend 1049 in some embodiments. A deployment request causes the model hosting system 140 to deploy a trained machine learning model into a virtual machine instance 1042. For example, the deployment request can include an identification of an endpoint (e.g., an endpoint name, such as an HTTP endpoint name) and an identification of one or more trained machine learning models (e.g., a location of one or more model data files stored in the training model data store 1075). Optionally, the deployment request also includes an identification of one or more container images stored in the container data store 1070.

Upon receiving the deployment request, the model hosting system 140 initializes ones or more ML scoring containers 1050 in one or more hosted virtual machine instance 1042. In embodiments in which the deployment request includes an identification of one or more container images, the model hosting system 140 forms the ML scoring container(s) 1050 from the identified container image(s). For example, a container image identified in a deployment request can be the same container image used to form an ML training container 1030 used to train the machine learning model corresponding to the deployment request. Thus, the code 1056 of the ML scoring container(s) 1050 includes one or more executable instructions in the container image(s) that represent an algorithm that defines a machine learning model. In embodiments in which the deployment request does not include an identification of a container image, the model hosting system 140 forms the ML scoring container(s) 1050 from one or more container images stored in the container data store 1070 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 1050 by retrieving model data corresponding to the identified trained machine learning model(s) in some embodiments. For example, the deployment request can identify a location of model data file(s) stored in the training model data store 1075. In embodiments in which a single model data file is identified in the deployment request, the model hosting system 140 retrieves the identified model data file from the training model data store 1075 and inserts the model data file into a single ML scoring container 1050, which forms a portion of code 1056. In some embodiments, the model data file is archived or compressed (e.g., formed from a package of individual files). Thus, the model hosting system 140 unarchives or decompresses the model data file to obtain multiple individual files and inserts the individual files into the ML scoring container 1050. In some embodiments, the model hosting system 140 stores the model data file in the same location as the location in which the model data file was stored in the ML training container 1030 that generated the model data file. For example, the model data file initially was stored in the top container layer of the ML training container 1030 at a certain offset, and the model hosting system 140 then stores the model data file in the top container layer of the ML scoring container 1050 at the same offset.

In embodiments in which multiple model data files are identified in the deployment request, the model hosting system 140 retrieves the identified model data files from the training model data store 1075. The model hosting system 140 can insert the model data files into the same ML scoring container 1050, into different ML scoring containers 1050 initialized in the same virtual machine instance 1042, or into different ML scoring containers 1050 initialized in different virtual machine instances 1042. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 1050 with the endpoint identified in the deployment request. For example, each of the initialized ML scoring container(s) 1050 can be associated with a network address. The model hosting system 140 can map the network address(es) to the identified endpoint, and the model hosting system 140 or another system (e.g., a routing system, not shown) can store the mapping. Thus, a user device 1002 can refer to trained machine learning model(s) stored in the ML scoring container(s) 1050 using the endpoint. This allows for the network address of an ML scoring container 1050 to change without causing the user operating the user device 1002 to change the way in which the user refers to a trained machine learning model.

Once the ML scoring container(s) 1050 are initialized, the ML scoring container(s) 1050 are ready to execute trained machine learning model(s). In some embodiments, the user device 1002 transmits an execution request to the model hosting system 140 via the frontend 1049, where the execution request identifies an endpoint and includes an input to a machine learning model (e.g., a set of input data). The model hosting system 140 or another system (e.g., a routing system, not shown) can obtain the execution request, identify the ML scoring container(s) 1050 corresponding to the identified endpoint, and route the input to the identified ML scoring container(s) 1050.

In some embodiments, a virtual machine instance 1042 executes the code 1056 stored in an identified ML scoring container 1050 in response to the model hosting system 140 receiving the execution request. In particular, execution of the code 1056 causes the executable instructions in the code 1056 corresponding to the algorithm to read the model data file stored in the ML scoring container 1050, use the input included in the execution request as an input parameter, and generate a corresponding output. As an illustrative example, the algorithm can include coefficients, weights, layers, cluster centroids, and/or the like. The executable instructions in the code 1056 corresponding to the algorithm can read the model data file to determine values for the coefficients, weights, layers, cluster centroids, and/or the like. The executable instructions can include input parameters, and the input included in the execution request can be supplied by the virtual machine instance 1042 as the input parameters. With the machine learning model characteristics and the input parameters provided, execution of the executable instructions by the virtual machine instance 1042 can be completed, resulting in an output.

In some embodiments, the virtual machine instance 1042 stores the output in the model prediction data store 1080. Alternatively or in addition, the virtual machine instance 1042 transmits the output to the user device 1002 that submitted the execution result via the frontend 1049.

In some embodiments, the execution request corresponds to a group of related trained machine learning models. Thus, the ML scoring container 1050 can transmit the output to a second ML scoring container 1050 initialized in the same virtual machine instance 1042 or in a different virtual machine instance 1042. The virtual machine instance 1042 that initialized the second ML scoring container 1050 can then execute second code 1056 stored in the second ML scoring container 1050, providing the received output as an input parameter to the executable instructions in the second code 1056. The second ML scoring container 1050 further includes a model data file stored therein, which is read by the executable instructions in the second code 1056 to determine values for the characteristics defining the machine learning model. Execution of the second code 1056 results in a second output. The virtual machine instance 1042 that initialized the second ML scoring container 1050 can then transmit the second output to the model prediction data store 1080 and/or the user device 1002 via the frontend 1049 (e.g., if no more trained machine learning models are needed to generate an output) or transmit the second output to a third ML scoring container 1050 initialized in the same or different virtual machine instance 1042 (e.g., if outputs from one or more additional trained machine learning models are needed), and the above-referenced process can be repeated with respect to the third ML scoring container 1050.

While the virtual machine instances 1042 are shown in FIG. 10 as a single grouping of virtual machine instances 1042, some embodiments of the present application separate virtual machine instances 1042 that are actively assigned to execute tasks from those virtual machine instances 1042 that are not actively assigned to execute tasks. For example, those virtual machine instances 1042 actively assigned to execute tasks are grouped into an "active pool," while those virtual machine instances 1042 not actively assigned to execute tasks are placed within a "warming pool." In some embodiments, those virtual machine instances 1042 within the warming pool can be pre-initialized with an operating system, language runtimes, and/or other software required to enable rapid execution of tasks (e.g., rapid initialization of ML scoring container(s) 1050, rapid execution of code 1056 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 1002, the model training system 120, etc.). The processing unit can also communicate to and from a memory of a virtual machine instance 1042 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 120 and the model hosting system 140 depicted in FIG. 10 are not meant to be limiting. For example, the model training system 120 and/or the model hosting system 140 could also operate within a computing environment having a fewer or greater number of devices than are illustrated in FIG. 10. Thus, the depiction of the model training system 120 and/or the model hosting system 140 in FIG. 10 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 1029 processes all training requests received from user devices 1002 and provisions virtual machine instances 1022. In some embodiments, the frontend 1029 serves as a front door to all the other services provided by the model training system 120. The frontend 1029 processes the requests and makes sure that the requests are properly authorized. For example, the frontend 1029 may determine whether the user associated with the training request is authorized to initiate the training process.

Similarly, frontend 1049 processes all deployment and execution requests received from user devices 1002 and provisions virtual machine instances 1042. In some embodiments, the frontend 1049 serves as a front door to all the other services provided by the model hosting system 140. The frontend 1049 processes the requests and makes sure that the requests are properly authorized. For example, the frontend 1049 may determine whether the user associated with a deployment request or an execution request is authorized to access the indicated model data and/or to execute the indicated machine learning model.

The training data store 1060 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 1060 is depicted as being located external to the model training system 120 and the model hosting system 140, this is not meant to be limiting. For example, in some embodiments not shown, the training data store 1060 is located internal to at least one of the model training system 120 or the model hosting system 140.

In some embodiments, the training metrics data store 1065 stores model metrics. While the training metrics data store 1065 is depicted as being located external to the model training system 120 and the model hosting system 140, this is not meant to be limiting. For example, in some embodiments not shown, the training metrics data store 1065 is located internal to at least one of the model training system 120 or the model hosting system 140.

The container data store 1070 stores container images, such as container images used to form ML training containers 1030 and/or ML scoring containers 1050, that can be retrieved by various virtual machine instances 1022 and/or 1042. While the container data store 1070 is depicted as being located external to the model training system 120 and the model hosting system 140, this is not meant to be limiting. For example, in some embodiments not shown, the container data store 1070 is located internal to at least one of the model training system 120 and the model hosting system 140.

The training model data store 1075 stores model data files. In some embodiments, some of the model data files are comprised of a single file, while other model data files are packages of multiple individual files. While the training model data store 1075 is depicted as being located external to the model training system 120 and the model hosting system 140, this is not meant to be limiting. For example, in some embodiments not shown, the training model data store 1075 is located internal to at least one of the model training system 120 or the model hosting system 140.

The model prediction data store 1080 stores outputs (e.g., execution results) generated by the ML scoring containers 1050 in some embodiments. While the model prediction data store 1080 is depicted as being located external to the model training system 120 and the model hosting system 140, this is not meant to be limiting. For example, in some embodiments not shown, the model prediction data store 1080 is located internal to at least one of the model training system 120 and the model hosting system 140.

While the model training system 120, the model hosting system 140, the training data store 1060, the training metrics data store 1065, the container data store 1070, the training model data store 1075, and the model prediction data store 1080 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 1002 via the one or more network(s) 106.

Various example user devices 1002 are shown in FIG. 10, including a desktop computer, laptop, and a mobile phone, each provided by way of illustration. In general, the user devices 1002 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. In some embodiments, the model training system 120 and/or the model hosting system 140 provides the user devices 1002 with one or more user interfaces, command-line interfaces (CLI), application programing interfaces (API), and/or other programmatic interfaces for submitting training requests, deployment requests, and/or execution requests. In some embodiments, the user devices 1002 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 11:
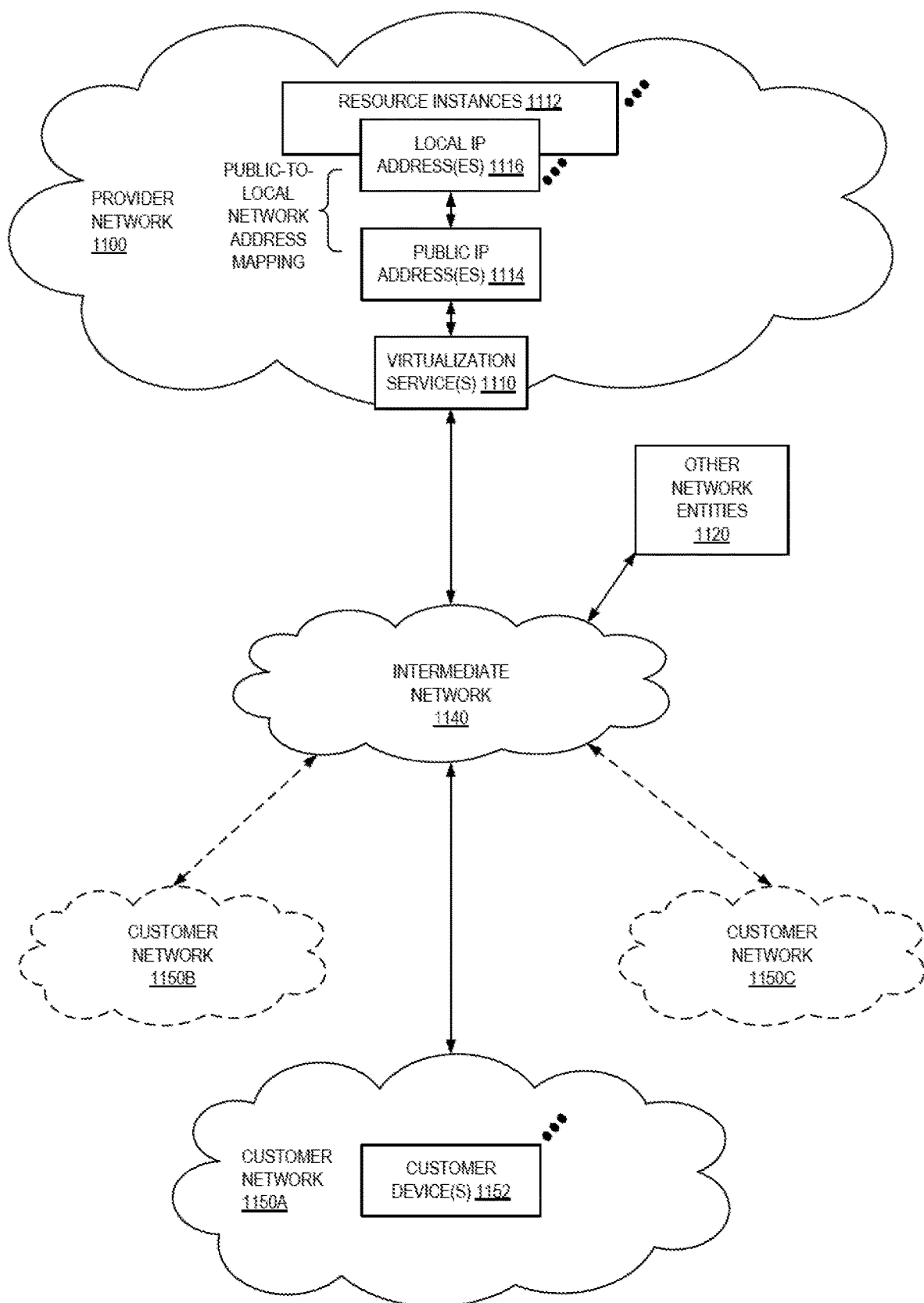
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
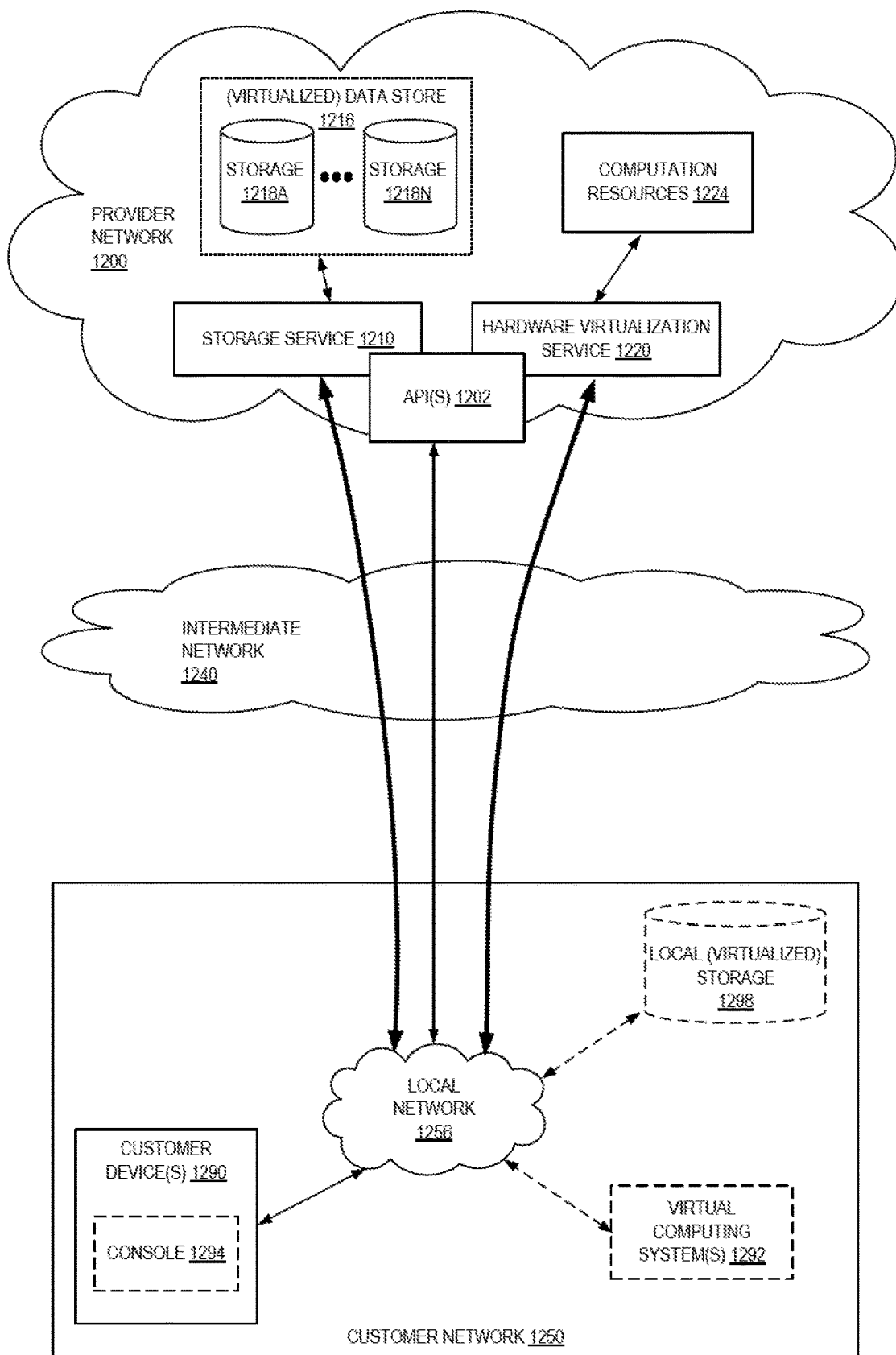
FIG. 12 is a block diagram of an example provider network that provides a storage service and a hardware virtualization service to customers according to some embodiments.

FIG. 12 is a block diagram of an example provider network that provides a storage service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage service 1210, for example via one or more APIs 1202, to access data from and store data to storage resources 1218A-1218N of a virtual data store 1216 (e.g., a folder or "bucket", a virtualized volume, a database, etc.) provided by the provider network 1200. In some embodiments, a virtualized data store gateway (not shown) may be provided at the customer network 1250 that may locally cache at least some data, for example frequently-accessed or critical data, and that may communicate with storage service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes via storage service 1210 acting as a storage virtualization service, and these volumes may appear to the user as local (virtualized) storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative Systems

Figure 13:
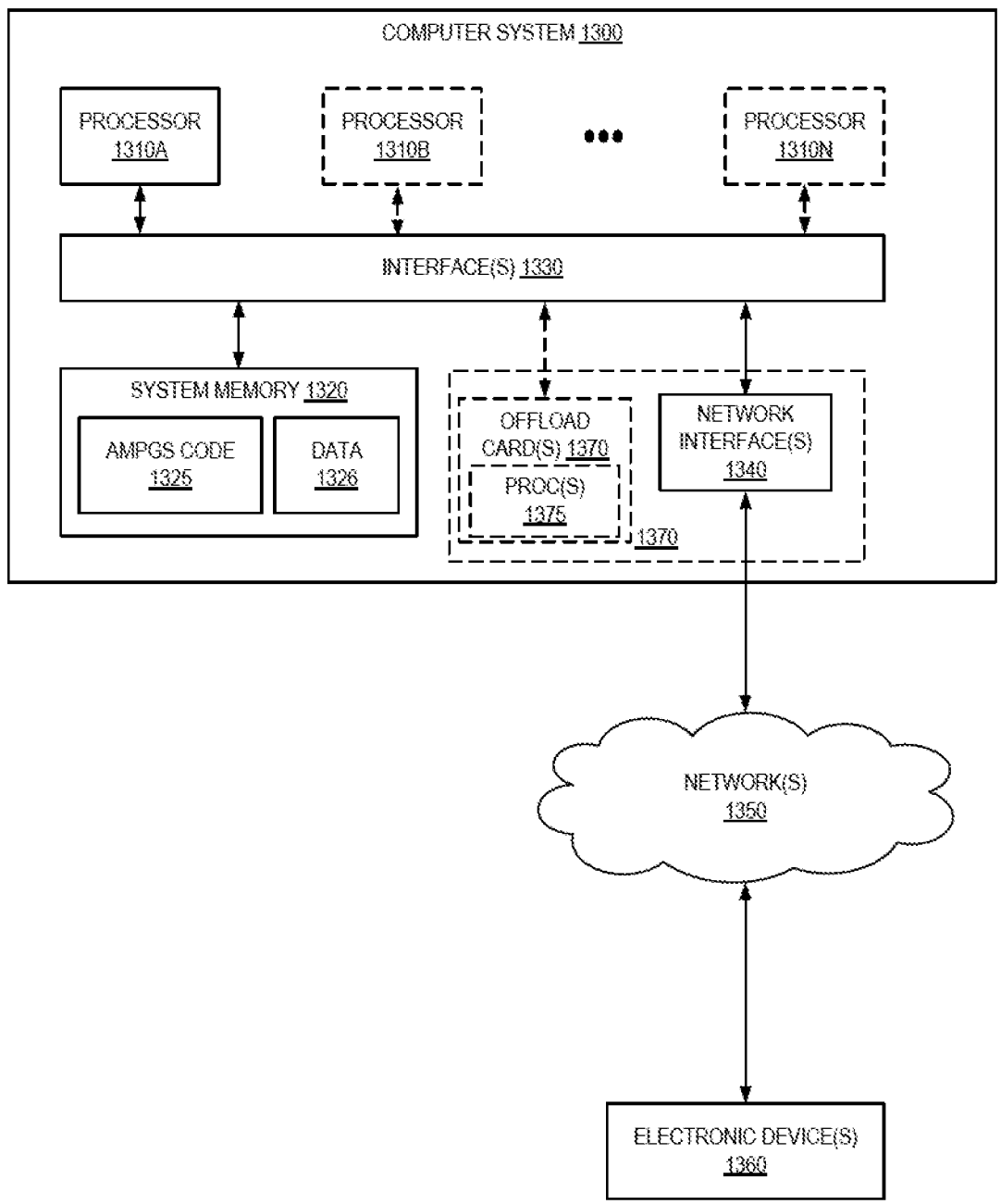
FIG. 13 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1320 as AMPGS code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1218A-1218N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an endpoint of a provider network, a request message originated by a computing device of a user to identify a machine learning (ML) pipeline based at least in part on a dataset, the request message identifying the dataset, an exploration budget, and an objective metric;
   generating, based at least in part on the dataset, a plurality of ML pipeline plans, wherein each ML pipeline plan identifies at least one preprocessing stage and one ML model algorithm type;
   transmitting a message to the computing device of the user that identifies the plurality of ML pipeline plans;
   receiving a message originated by the computing device indicating a request to perform a ML pipeline exploration based on one or more of the plurality of ML pipeline plans;
   initiating the ML pipeline exploration, the ML pipeline exploration including:
      executing, at least partially in parallel, a plurality of preprocessing stages identified within the plurality of ML pipeline plans to yield a plurality of processed data sets, wherein each of the preprocessing stages utilizes at least some values of the dataset or values derived based on the dataset; and
      executing a plurality of ML model training jobs, at least partially in parallel, each execution utilizing at least one of the plurality of processed data sets to train a ML model using one of the ML model algorithm types; and
   transmitting data to the computing device of the user indicating a result of the ML pipeline exploration, the result indicating a value of the objective metric for each of the plurality of ML model training jobs.

2. The computer-implemented method of claim 1, wherein the exploration budget indicates at least one of:
   a maximum number of ML model training jobs to execute;
   a maximum amount of time associated with an aspect of the ML pipeline exploration; or
   a maximum cost associated with the ML pipeline exploration.

3. The computer-implemented method of claim 1, further comprising:
   receiving a second request message originated by the computing device of the user indicating a request to deploy an ML pipeline corresponding to one of the plurality of ML model training jobs;
   transmitting a message to cause a model hosting system of the provider network to deploy the ML pipeline behind an endpoint; and
   transmitting an identifier of the endpoint to the computing device or to a storage location.

4. A computer-implemented method comprising:
   receiving a first request message originated by a computing device of a user to identify a machine learning (ML) pipeline based at least in part on a dataset, the first request message identifying the dataset and an exploration budget;
   generating, based at least in part on the dataset, a plurality of ML pipeline plans;
   transmitting a first one or more messages to the computing device to cause the computing device to present information associated with the plurality of ML pipeline plans to the user;
   receiving a second request message originated by the computing device to begin an exploration of at least two of the plurality of ML pipeline plans;
   training, based on at least a portion of the dataset and on the exploration budget, a plurality of ML models corresponding to the at least two ML pipeline plans; and transmitting a second one or more messages to the computing device of the user indicating a result of the training;
receiving a third request message originated by the computing device of the user indicating a request to deploy an ML pipeline corresponding to one of the plurality of ML pipeline plans;
transmitting a fourth request message to cause a model hosting system of a provider network to deploy the ML pipeline behind an endpoint; and
transmitting an identifier of the endpoint to the computing device or to a storage location.

5. The computer-implemented method of claim 4, wherein the exploration budget indicates at least one of:
a maximum number of ML models to be trained as part of the training;
a maximum amount of time associated with an aspect of the training; or
a maximum cost associated with the training.

6. The computer-implemented method of claim 4, wherein the first request message includes a resource identifier of a storage location of the dataset, and wherein the method further comprises:
obtaining, by a machine learning service of a multi-tenant provider network, the dataset from a storage service via use of the resource identifier.

7. The computer-implemented method of claim 6, further comprising:
splitting the dataset into a plurality of sets, the plurality of sets including a training set,
wherein the training of the plurality of the plurality of ML models utilizes at least the training set.

8. The computer-implemented method of claim 4, wherein the training of the plurality of ML models is performed at least partially in parallel in that at least two of the plurality of ML models are actively trained at least partially at a same point in time.

9. The computer-implemented method of claim 4, wherein the information, for each of the plurality of ML pipeline plans, identifies one or more preprocessing stages and a ML model algorithm type.

10. The computer-implemented method of claim 9, wherein the information is presented to the user by the computing device via an interactive code application, and wherein the method further comprises:
receiving a fifth request message originated by the computing device of the user indicating a request to perform one stage of one of the plurality of ML pipeline plans.

11. The computer-implemented method of claim 10, further comprising:
receiving a sixth request message originated by the computing device of the user indicating a request to perform a modified pipeline of one of the plurality of ML pipeline plans, wherein the modified pipeline was generated by the user based on the one ML pipeline plan.

12. The computer-implemented method of claim 4, wherein the transmitting of the second one or more messages to the computing device of the user causes the computing device of the user to present the result to the user, the result including identifiers of a plurality of trials corresponding to the plurality of ML models, wherein for each of the plurality of trials the result includes a value of an objective metric generated by the training of the corresponding ML model.

13. The computer-implemented method of claim 12, wherein the first request message further identifies the objective metric.

14. The computer-implemented method of claim 4, further comprising:
generating another ML pipeline including an ensemble ML model based on at least two of the plurality of ML models.

15. A system comprising:
a first one or more electronic devices to implement a storage service of a provider network, the storage service to receive a dataset transmitted on behalf of a user and store the dataset to a storage location; and
a second one or more electronic devices to implement a machine learning (ML) service of the provider network, the ML service including instructions that upon execution cause the ML service to:
receive a request message originated by a computing device of the user to identify an ML pipeline based at least in part on the dataset, the request message identifying the dataset and an exploration budget;
generate, based at least in part on the dataset, a plurality of ML pipeline plans;
transmit, to the computing device, information associated with the plurality of ML pipeline plans, wherein the information is presented to the user by the computing device via an interactive code application;
train, based on at least a portion of the dataset and on the exploration budget, a plurality of ML models corresponding to the plurality of ML pipeline plans;
transmit data to the computing device of the user indicating a result of the training;
receive a second request message originated by the computing device of the user indicating a request to perform one stage or pipeline of one of the plurality of ML pipeline plans; and
cause the one stage or pipeline to be executed.

16. The system of claim 15, wherein the ML service causes the plurality of ML models to be trained at least partially in parallel in that at least two of the plurality of ML models are actively trained at least partially at a same point in time.

17. The system of claim 15, wherein the information associated with the plurality of ML pipeline plans includes, for each of the plurality of ML pipeline plans, an identifier of one or more preprocessing stages and a ML model algorithm type.

18. The system of claim 16, wherein the instructions upon execution further cause the ML service to:
receive a third request message originated by the computing device of the user indicating a request to perform a modified stage of one of the plurality of ML pipeline plans, wherein the modified stage was specified by the user based on the one stage; and
cause the modified stage to be executed.

19. A computer-implemented method comprising:
receiving a first request message originated by a computing device of a user to identify a machine learning (ML) pipeline based at least in part on a dataset, the first request message identifying the dataset and an exploration budget;
generating, based at least in part on the dataset, a plurality of ML pipeline plans;

transmitting a first one or more messages to the computing device to cause the computing device to present information associated with the plurality of ML pipeline plans to the user;

receiving a second request message originated by the computing device to begin an exploration of at least two of the plurality of ML pipeline plans;

training, based on at least a portion of the dataset and on the exploration budget, a plurality of ML models corresponding to the at least two ML pipeline plans; and transmitting a second one or more messages to the computing device of the user indicating a result of the training, wherein the transmitting of the second one or more messages to the computing device of the user causes the computing device of the user to present the result to the user, the result including identifiers of a plurality of trials corresponding to the plurality of ML models, wherein for each of the plurality of trials the result includes a value of an objective metric generated by the training of the corresponding ML model.

20. The computer-implemented method of claim 19, wherein the first request message further identifies the objective metric.

21. The computer-implemented method of claim 19, wherein the exploration budget indicates at least one of:
- a maximum number of ML models to be trained as part of the training;
- a maximum amount of time associated with an aspect of the training; or
- a maximum cost associated with the training.

22. The computer-implemented method of claim 19, wherein the training of the plurality of ML models is performed at least partially in parallel in that at least two of the plurality of ML models are actively trained at least partially at a same point in time.

23. The computer-implemented method of claim 19, wherein the information, for each of the plurality of ML pipeline plans, identifies one or more preprocessing stages and a ML model algorithm type.

* * * * *